US012809523B2

(12) United States Patent
Shen et al.

(10) Patent No.: US 12,809,523 B2
(45) Date of Patent: Nov. 24, 2026

(54) MEMORY COMMAND ASSIGNMENT BASED ON COMMAND PROCESSOR WORKLOAD

(71) Applicant: Micron Technology, Inc., Boise, ID (US)

(72) Inventors: Guang Shen, Shanghai (CN); Yue Wei, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 84 days.

(21) Appl. No.: 18/925,770

(22) Filed: Oct. 24, 2024

(65) Prior Publication Data

US 2025/0044947 A1 Feb. 6, 2025

Related U.S. Application Data

(62) Division of application No. 17/821,894, filed on Aug. 24, 2022, now Pat. No. 12,141,439.

(30) Foreign Application Priority Data

Aug. 19, 2022 (CN) ......................... 202210998627.5

(51) Int. Cl.
*G06F 3/06* (2006.01)

(52) U.S. Cl.
CPC .......... *G06F 3/0613* (2013.01); *G06F 3/0635* (2013.01); *G06F 3/0679* (2013.01)

(58) Field of Classification Search
CPC ..... G06F 3/0613; G06F 3/0635; G06F 3/0679
See application file for complete search history.

(56) References Cited

U.S. PATENT DOCUMENTS 9,514,294 B1 * 12/2016 Hepburn ............. H04L 63/0281
9,798,375 B1 * 10/2017 Becker .................. G06F 9/5094
10,402,120 B2 9/2019 Balakrishnan
(Continued)

FOREIGN PATENT DOCUMENTS

AU 2020101218 A4 8/2020
CN 109564556 A 4/2019
(Continued)

*Primary Examiner* — Prasith Thammavong
(74) *Attorney, Agent, or Firm* — Harrity & Harrity, LLP

(57) ABSTRACT

Implementations described herein relate to memory command assignment based on command processor workload. In some implementations, a memory device may determine a first command type of a first memory command. The memory device may identify a first command processor, associated with the first command type, that is one of multiple command processors configured to execute memory commands. The first command processor may be configured to execute only commands having the first command type unless a computational credit condition, associated with another command processor, is satisfied. The memory device may determine that a cumulative computational credit value associated with the first command processor does not satisfy a condition. The memory device may assign the first memory command to the first command processor for execution based on determining that the cumulative computational credit value associated with the first command processor does not satisfy the condition.

14 Claims, 12 Drawing Sheets

(56) References Cited

U.S. PATENT DOCUMENTS

| | | | | |
|---|---|---|---|---|
| 10,728,289 | B2 | 7/2020 | Hughes et al. | |
| 10,841,427 | B1 | 11/2020 | Lahav et al. | |
| 11,755,490 | B2 | 9/2023 | Cariello et al. | |
| 11,797,187 | B2 * | 10/2023 | Canepa | G06F 3/0611 |
| 12,301,463 | B2 * | 5/2025 | Liu | H04L 43/024 |
| 2013/0173846 | A1 | 7/2013 | Lassa et al. | |
| 2014/0020080 | A1 | 1/2014 | Antypas, III et al. | |
| 2017/0168970 | A1 | 6/2017 | Sajeepa et al. | |
| 2021/0174257 | A1 | 6/2021 | Pothula et al. | |
| 2024/0061585 | A1 | 2/2024 | Shen et al. | |

FOREIGN PATENT DOCUMENTS

| | | | |
|---|---|---|---|
| CN | 114026838 | A | 2/2022 |
| CN | 114639418 | A | 6/2022 |

* cited by examiner

MEMORY COMMAND ASSIGNMENT BASED ON COMMAND PROCESSOR WORKLOAD

CROSS-REFERENCE TO RELATED APPLICATION

This application is a division of U.S. patent application Ser. No. 17/821,894, filed Aug. 24, 2022, which claims priority to China Patent Application No. 202210998627.5, filed on Aug. 19, 2022, entitled "MEMORY COMMAND ASSIGNMENT BASED ON COMMAND PROCESSOR WORKLOAD," the contents of which are incorporated herein by reference in their entireties.

TECHNICAL FIELD

The present disclosure generally relates to memory devices, memory device operations, and, for example, to memory command assignment based on command processor workload.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, the electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
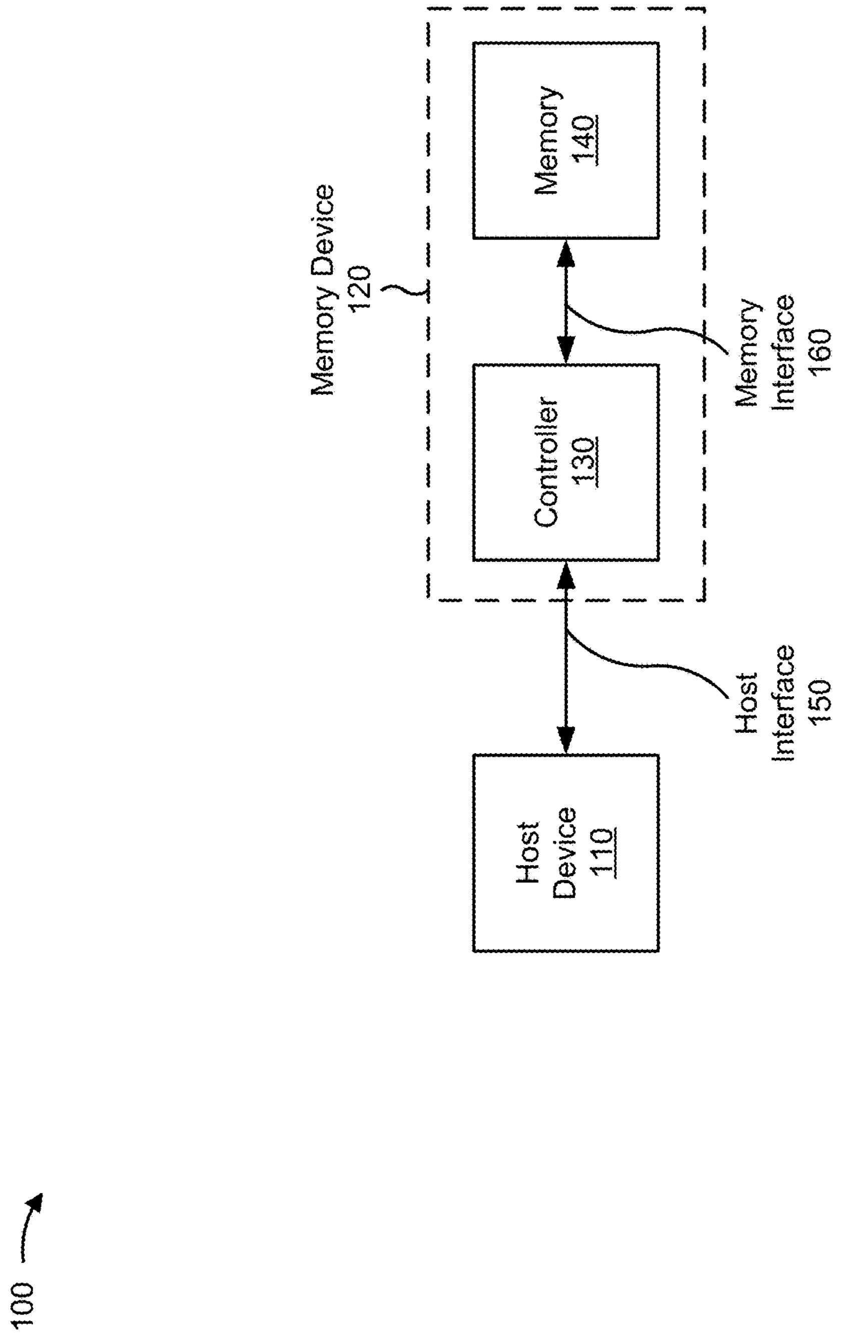
FIG. 1 is a diagram illustrating an example system capable of memory command assignment based on command processor workload.

Input/output (I/O) operations per second (IOPS) is a common performance measurement for memory devices, such as solid state drives (SSDs). IOPS refers to the total number of I/O operations that a memory device is capable of performing per second. A larger number of IOPS means better performance and lower latency for memory operations, such as read and write operations. Example IOPS performance metrics include random read IOPS in which data is read from non-contiguous memory locations (e.g., for a small data transfer), random write IOPS in which data is written to non-contiguous memory locations, sequential read IOPS in which data is read from contiguous memory locations (e.g., for a large data transfer), and sequential write IOPS in which data is written to contiguous memory locations.

A memory device may be manufactured to satisfy one or more IOPS requirements, such as a random read IOPS requirement of 1,500,000 (1.5 million) IOPS. High IOPS requirements can be difficult to satisfy. For example, if a command processor (sometimes called a "processor") of a memory device executes instructions at a frequency of 900 megahertz (MHz) and has a random read requirement of 1.5 million IOPS, then the memory device needs to handle one random read command every 600 processor cycles (900,000,000 Hz/1.5 million IOPS). It may be difficult or impossible for a processor of the memory device to complete read operations within 600 processor cycles, particularly for random read operations in which data needs to be retrieved from non-contiguous memory locations and/or for large data transfer sizes.

To assist with satisfying read and write IOPS requirements, some memory devices (e.g., SSDs) include multiple processors, with one processor dedicated to processing (e.g., executing) read commands and one processor dedicated to processing write commands, as an example. This may lead to a larger number of IOPS and better performance, particularly for SSDs capable of parallel processing, such as parallel processing on different dies and/or parallel processing using non-volatile memory express (NVMe) specifications. Even for non-parallel (e.g., sequential) processing, this configuration can lead to higher IOPS with conserving processing resources required to prioritize memory commands as compared to a configuration where each processor handles multiple different types of memory commands, such as read commands and write commands. For example, using dedicated processors, performance of the memory device can be controlled by controlling a number of commands processed by a particular processor (e.g., a read-dedicated processor) before another processor (e.g., a write-dedicated processor) executes one or more commands. To achieve this fine-grained control for a non-dedicated processor that handles multiple command types (e.g., read commands and write commands) would require queue management to prioritize read or write operations in a queue of commands to be executed by the non-dedicated processor and/or to identify which command in the queue should be processed next (e.g., which may not be the oldest command in the queue). Thus, using dedicated processors, dedicated to a particular type of memory command, can reduce processing necessary for queue management and reduce latency, thus increasing IOPS.

However, in some cases, using dedicated processors to handle memory commands can be inefficient. For example, if the memory device has a high read workload and a low write workload, then the read-dedicated processor can become overloaded while the write-dedicated processor is idle. One way to address this is to add another read-dedicated processor to the memory device. However, this leads to increased manufacturing cost, high power consumption, and wasted resources because other processors are idle.

Some implementations described herein enable dynamic dispatching of memory commands to processors that are dedicated to a particular type of memory command by default. Under normal operations, when a workload condition is not satisfied for any of the processors, each processor executes only memory commands having a type associated with that processor (e.g., read or write). When the workload condition is satisfied, such as when one of the dedicated processors is overloaded, memory commands that would normally be assigned only to that dedicated processor can be assigned to one or more other processors that would normally not handle that type of command. In this way, performance requirements (e.g., an IOPS requirement) of the memory device can be satisfied and performance of the memory device can be improved (e.g., to reduce latency) without the need to add additional dedicated processors to the memory device. Thus, some implementations described herein improve performance by better utilization of processor resources without increasing manufacturing costs or increasing power consumption.

FIG. 1 is a diagram illustrating an example system 100 capable of memory command assignment based on command processor workload. The system 100 may include one or more devices, apparatuses, and/or components for performing operations described herein. For example, the system 100 may include a host device 110 and a memory device 120. The memory device 120 may include a controller 130 and memory 140. The host device 110 may communicate with the memory device 120 (e.g., the controller 130 of the memory device 120) via a host interface 150. The controller 130 and the memory 140 may communicate via a memory interface 160.

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host device 110 may include one or more processors configured to execute instructions and store data in the memory 140. For example, the host device 110 may include a central processing unit (CPU), a graphics processing unit (GPU), a field-programmable gate array (FPGA), an application-specific integrated circuit (ASIC), and/or another type of processing component.

The memory device 120 may be any electronic device or apparatus configured to store data in memory. In some implementations, the memory device 120 may be an electronic device configured to store data persistently in non-volatile memory. For example, the memory device 120 may be a hard drive, a solid-state drive (SSD), a flash memory device (e.g., a NAND flash memory device or a NOR flash memory device), a universal serial bus (USB) thumb drive, a memory card (e.g., a secure digital (SD) card), a secondary storage device, a non-volatile memory express (NVMe) device, and/or an embedded multimedia card (eMMC) device. In this case, the memory 140 may include non-volatile memory configured to maintain stored data after the memory device 120 is powered off. For example, the memory 140 may include NAND memory or NOR memory. In some implementations, the memory 140 may include volatile memory that requires power to maintain stored data and that loses stored data after the memory device 120 is powered off, such as one or more latches and/or random-access memory (RAM), such as dynamic RAM (DRAM) and/or static RAM (SRAM). For example, the volatile memory may cache data read from or to be written to non-volatile memory, and/or may cache instructions to be executed by the controller 130.

The controller 130 may be any device configured to communicate with the host device (e.g., via the host interface 150) and the memory 140 (e.g., via the memory interface 160). Additionally, or alternatively, the controller 130 may be configured to control operations of the memory device 120 and/or the memory 140. For example, the controller 130 may include a memory controller, a system controller, an ASIC, an FPGA, a processor, a microcontroller, and/or one or more processing components. In some implementations, the controller 130 may be a high-level controller, which may communicate directly with the host device 110 and may instruct one or more low-level controllers regarding memory operations to be performed in connection with the memory 140. In some implementations, the controller 130 may be a low-level controller, which may receive instructions regarding memory operations from a high-level controller that interfaces directly with the host device 110. As an example, a high-level controller may be an SSD controller, and a low-level controller may be a non-volatile memory controller (e.g., a NAND controller) or a volatile memory controller (e.g., a DRAM controller). In some implementations, a set of operations described herein as being performed by the controller 130 may be performed by a single controller (e.g., the entire set of operations may be performed by a single high-level controller or a single low-level controller). Alternatively, a set of operations described herein as being performed by the controller 130 may be performed by more than one controller (e.g., a first subset of the operations may be performed by a high-level controller and a second subset of the operations may be performed by a low-level controller).

The host interface 150 enables communication between the host device 110 and the memory device 120. The host interface 150 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, and/or an embedded multimedia card (eMMC) interface.

The memory interface 160 enables communication between the memory device 120 and the memory 140. The memory interface 160 may include a non-volatile memory interface (e.g., for communicating with non-volatile memory), such as a NAND interface or a NOR interface. Additionally, or alternatively, the memory interface 160 may include a volatile memory interface (e.g., for communicating with volatile memory), such as a double data rate (DDR) interface.

In some implementations, the memory device 120 and/or the controller 130 may be configured to detect a memory command to be executed; determine a command type of the memory command, wherein the command type is one of a first command type or a second command type; identify a primary command processor associated with the command type, wherein the primary command processor is one of a plurality of command processors that are configured to execute memory commands for the memory device 120, and wherein the primary command processor is configured to execute only commands having the first command type unless a first computational credit condition, associated with another command processor of the plurality of command processors, is satisfied; determine a cumulative computational credit value, associated with the primary command processor, based on memory commands that are assigned to the primary command processor; and selectively assign the memory command to the primary command processor or a secondary command processor, of the plurality of command processors, based on whether the cumulative computational credit value satisfies a threshold, wherein the secondary command processor is configured to execute only commands having the second command type unless a second computational credit condition, associated with another command processor of the plurality of command processors, is satisfied.

Additionally, or alternatively, the memory device 120 and/or the controller 130 may be configured to determine a first command type of a first memory command to be executed by the memory device 120; identify a first command processor associated with the first command type, wherein the first command processor is one of a plurality of command processors that are configured to execute memory commands for the memory device 120, and wherein the first command processor is configured to execute only commands having the first command type unless a computational credit condition, associated with another command processor of the plurality of command processors, is satisfied; determine that a cumulative computational credit value associated with the first command processor does not satisfy a condition, wherein the cumulative computational credit value is based on one or more computational credit values corresponding to one or more memory commands that are assigned to the first command processor for execution; and assign the first memory command to the first command processor for execution based on determining that the cumulative computational credit value associated with the first command processor does not satisfy the condition.

Additionally, or alternatively, the memory device 120 and/or the controller 130 may be configured to identify historical workload information for a plurality of command processors configured to execute memory commands for the memory device 120, wherein the historical workload information indicates a plurality of memory commands received or detected by the memory device 120; determine a percentage of memory commands, included in the plurality of memory commands, having a first command type; determine a ratio for distributing memory commands of the first command type to a first command processor or a second command processor, wherein the first command processor is included in the plurality of command processors and is configured to execute commands having the first command type, and wherein the second command processor is included in the plurality of command processors and is configured to execute only commands having a second command type, that is different from the first command type, unless a historical workload condition associated with the historical workload information is satisfied; and distribute a plurality of incoming memory commands between the first command processor and the second command processor based on the ratio.

As indicated above, FIG. 1 is provided as an example. Other examples may differ from what is described with regard to FIG. 1.

Figure 2:
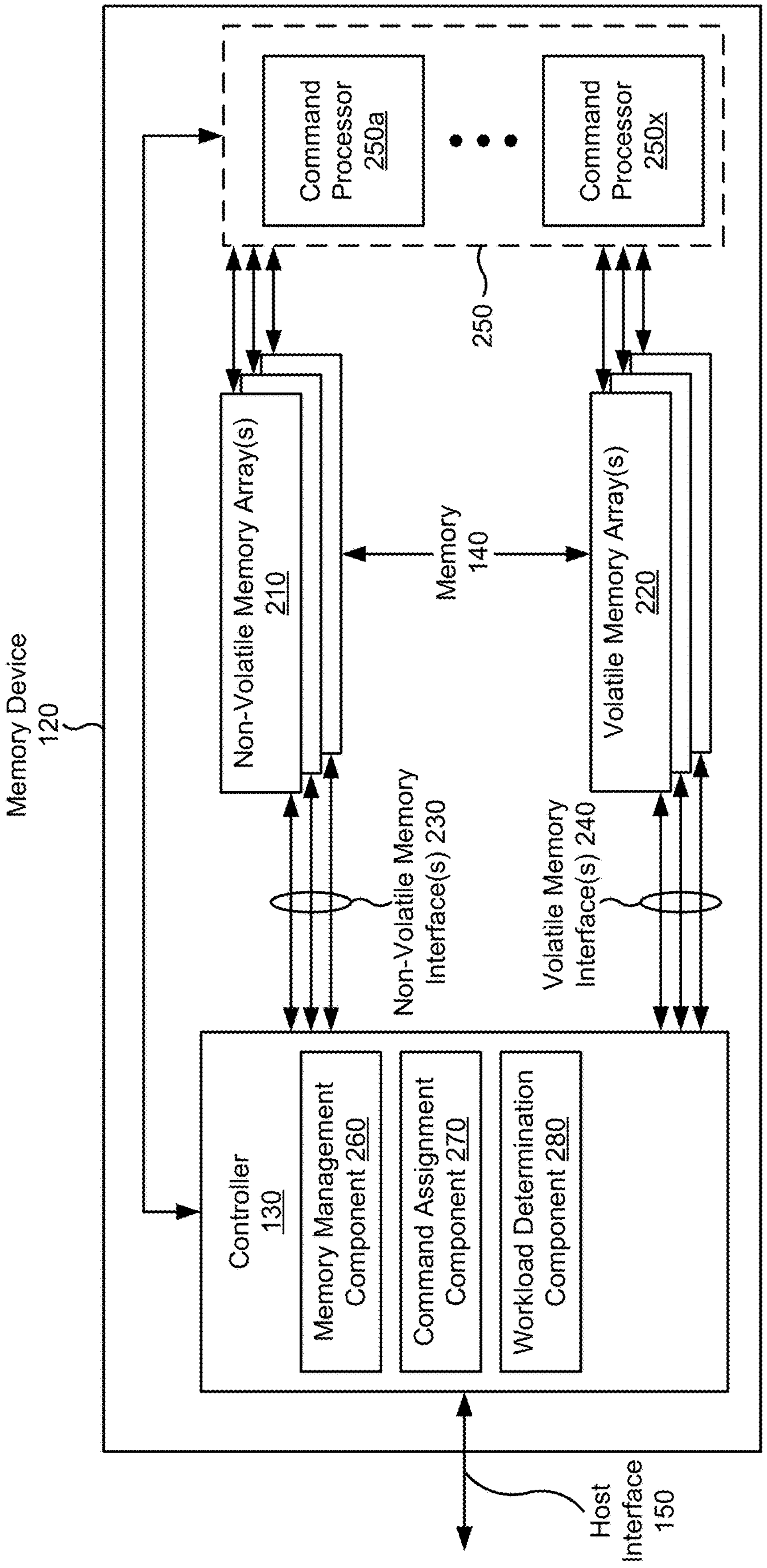
FIG. 2 is a diagram of example components included in a memory device.

FIG. 2 is a diagram of example components included in a memory device 120. As described above in connection with FIG. 1, the memory device 120 may include a controller 130 and memory 140. As shown in FIG. 2, the memory 140 may include one or more non-volatile memory arrays 210, such as one or more NAND memory arrays and/or one or more NOR memory arrays. Additionally, or alternatively, the memory 140 may include one or more volatile memory arrays 220, such as one or more SRAM arrays and/or one or more DRAM arrays. The controller 130 may transmit signals to and receive signals from a non-volatile memory array 210 using a non-volatile memory interface 230. The controller 130 may transmit signals to and receive signals from a volatile memory array 220 using a volatile memory interface 240.

The controller 130 may control operations of the memory 140, such as by executing one or more instructions. For example, the memory device 120 may store one or more instructions in the memory 140 as firmware, and the controller 130 may execute those one or more instructions. Additionally, or alternatively, the controller 130 may receive one or more instructions from the host device 110 via the host interface 150, and may execute those one or more instructions. In some implementations, a non-transitory computer-readable medium (e.g., volatile memory and/or non-volatile memory) may store a set of instructions (e.g., one or more instructions or code) for execution by the controller 130. The controller 130 may execute the set of instructions to perform one or more operations or methods described herein. In some implementations, execution of the set of instructions, by the controller 130, causes the controller 130 and/or the memory device 120 to perform one or more operations or methods described herein. In some implementations, hardwired circuitry is used instead of or in combination with the one or more instructions to perform one or more operations or methods described herein. Additionally, or alternatively, the controller 130 and/or one or more components of the memory device 120 may be configured to perform one or more operations or methods described herein. An instruction is sometimes called a "command."

For example, the controller 130 may transmit signals to and/or receive signals from the memory 140 based on the one or more instructions, such as to transfer data to (e.g., write or program), to transfer data from (e.g., read), and/or to erase all or a portion of the memory 140 (e.g., one or more memory cells, pages, sub-blocks, blocks, or planes of the memory 140). Additionally, or alternatively, the controller 130 may be configured to control access to the memory 140 and/or to provide a translation layer between the host device 110 and the memory 140 (e.g., for mapping logical addresses to physical addresses of a memory array). In some implementations, the controller 130 may translate a host interface command (e.g., a command received from the host device 110) into a memory interface command (e.g., a command for performing an operation on a memory array).

As shown in FIG. 2, the memory device 120 may include multiple (e.g., a plurality of) command processors 250, shown as command processor 250*a* through 250*x* (x≥2). A command processor 250 (sometimes called a processor) may include one or more processors configured to executed memory commands for the memory device 120, such as read commands, write commands, and/or erase commands. For example, a command processor 250 may include a CPU, a processor core (e.g., a CPU core), and/or another type of processing component. In some implementations, a command processor 250 is a dedicated processor that is dedicated to processing (e.g., executing) a particular command type or a particular set of command types (e.g., a subset of all command types that the memory device 120 can execute).

For example, a first command processor 250 may be dedicated to processing only read commands, and may be called a read-dedicated command processor (or a read-dedicated processor). As another example, a second command processor 250 may be dedicated to processing only write commands, and may be called a write-dedicated command processor (or a write-dedicated processor). As another example, a third command processor 250 may be dedicated to processing only flash translation layer (FTL) commands, and may be called an FTL-dedicated command processor (or an FTL-dedicated processor). In some implementations, the memory device 120 may include a command processor 250 dedicated to processing all command types that are not processed by any of the other dedicated command processors 250, sometimes called a common service command processor 250. Continuing with the examples above, the memory device 120 may include a fourth command processor 250 dedicated to processing non-read, non-write, and non-FTL commands.

According to some implementations described herein, under default operating conditions, such as when a workload condition is not satisfied for any of the command processors 250, each command processor 250 may process only the command types associated with that command processor 250 (e.g., the command types to which that command processor 250 is dedicated). For example, a first command processor 250 may process only commands having a first command type (e.g., only read commands), and a second command processor 250 may process only commands having a second command type (e.g., only write commands). Under high workload conditions, such as when the workload condition is satisfied for the first command processor 250, the second command processor 250 may be assigned and may process a command type that by default would only be processed by the first command processor 250 (and/or not by the second command processor 250). For example, if a workload condition is satisfied for a read-dedicated command processor that processes only read commands under default operating conditions, then the memory device 120 and/or the controller 130 may assign one or more read commands to a write-dedicated command processor that processes only write commands under default operating conditions. In this way, performance requirements (e.g., an IOPS requirement) of the memory device can be satisfied and performance of the memory device can be improved (e.g., to reduce latency) without the need to add additional dedicated processors to the memory device. Thus, some implementations described herein improve performance by better utilization of processor resources without increasing manufacturing costs or increasing power consumption.

The controller 130 may assign commands to command processors 250 based on a workload condition, as described in more detail elsewhere herein. For example, a command processor 250 may be associated with a queue of commands (e.g., stored in memory 140, such as a volatile memory array 220 and/or a cache associated with that command processor 250), and the controller 130 may place a command into an appropriate queue (e.g., associated with a command processor 250 that processes commands in that queue) based on the workload condition. A command processor 250 may sequentially execute commands in the queue associated with that command processor 250 (e.g., in a first-in, first-out manner). For example, a command processor 250 may execute a command by sending signals to memory 140, such as to one or more non-volatile memory arrays 210. In some implementations, the command processor 250 may notify the controller 130 when execution of a command is complete.

As shown in FIG. 2, the controller 130 may include a memory management component 260, a command assignment component 270, and/or a workload determination component 280. In some implementations, one or more of these components are implemented as one or more instructions (e.g., firmware) executed by the controller 130. Alternatively, one or more of these components may be implemented as dedicated integrated circuits distinct from the controller 130.

The memory management component 260 may be configured to manage performance of the memory device 120. For example, the memory management component 260 may perform wear leveling, bad block management, block retirement, read disturb management, and/or other memory management operations. In some implementations, the memory device 120 may store (e.g., in memory 140) one or more memory management tables. A memory management table may store information that may be used by or updated by the memory management component 260, such as information regarding memory block age, memory block erase count, and/or error information associated with a memory partition (e.g., a memory cell, a row of memory, a block of memory, or the like).

The command assignment component 270 may be configured to detect a memory command to be executed, determine a command type of that command, and identify a primary command processor (sometimes called a first command processor) associated with that command type, such as a primary command processor dedicated to processing commands having that command type. The command assignment component 270 may selectively assign the memory command to the primary command processor or a secondary command processor (sometimes called a second command processor) dedicated to processing commands having a different command type. For example, the command assignment component 270 may determine whether to assign the memory command to the primary command processor or the secondary command processor based on a workload condition. In some implementations, the command assignment component 270 may receive an indication, from the workload determination component 280, of whether the workload condition is satisfied. The command assignment component 270 may selectively assign the memory command to the primary command processor or the secondary command processor based on whether the workload condition is satisfied. Additionally, or alternatively, the command assignment component 270 may distribute commands between or among two or more command processors based on an indication from the workload determination component 280, such as an indication of a distribution ratio.

The workload determination component 280 may be configured to determine whether a workload condition, associated with a command processor 250, is satisfied. For example, the workload determination component 280 may determine a computational credit value associated with a command and/or may determine a cumulative computational credit value associated with a command processor 250 (e.g., by modifying or updating the cumulative computational credit value based on the computational credit value associated with the command), as described in more detail elsewhere herein. The workload determination component 280 may determine whether the workload condition is satisfied based on the cumulative computational credit value (e.g., based on whether the cumulative computational credit value satisfies a threshold). Additionally, or alternatively, the workload determination component 280 may determine or identify historical workload information for the memory device 120 (e.g., the command processors 250). The workload determination component 280 may determine whether the workload condition is satisfied based on the historical workload information, such as whether a percentage of commands of a particular command type satisfies a threshold. In some implementations, the workload determination component 280 may determine a distribution ratio for assigning commands to command processors 250 and may indicate the distribution ratio to the command assignment component 270. Additionally, or alternatively, the workload determination component 280 may indicate, to the command assignment component 270, whether the workload condition is satisfied.

Figure 5:
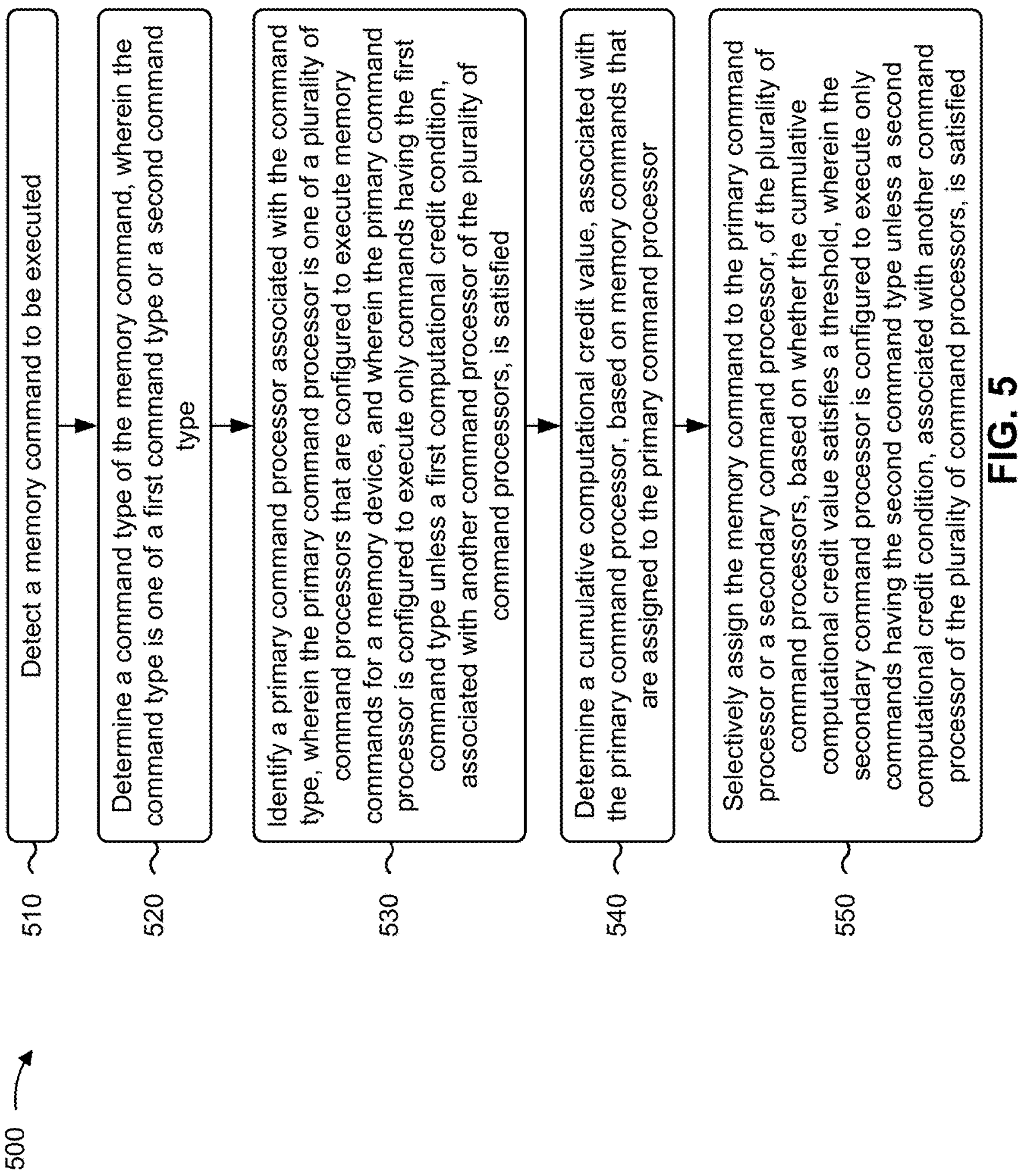
FIGS. 5-7 are flowcharts of example methods associated with memory command assignment based on command processor workload.
Figure 6:
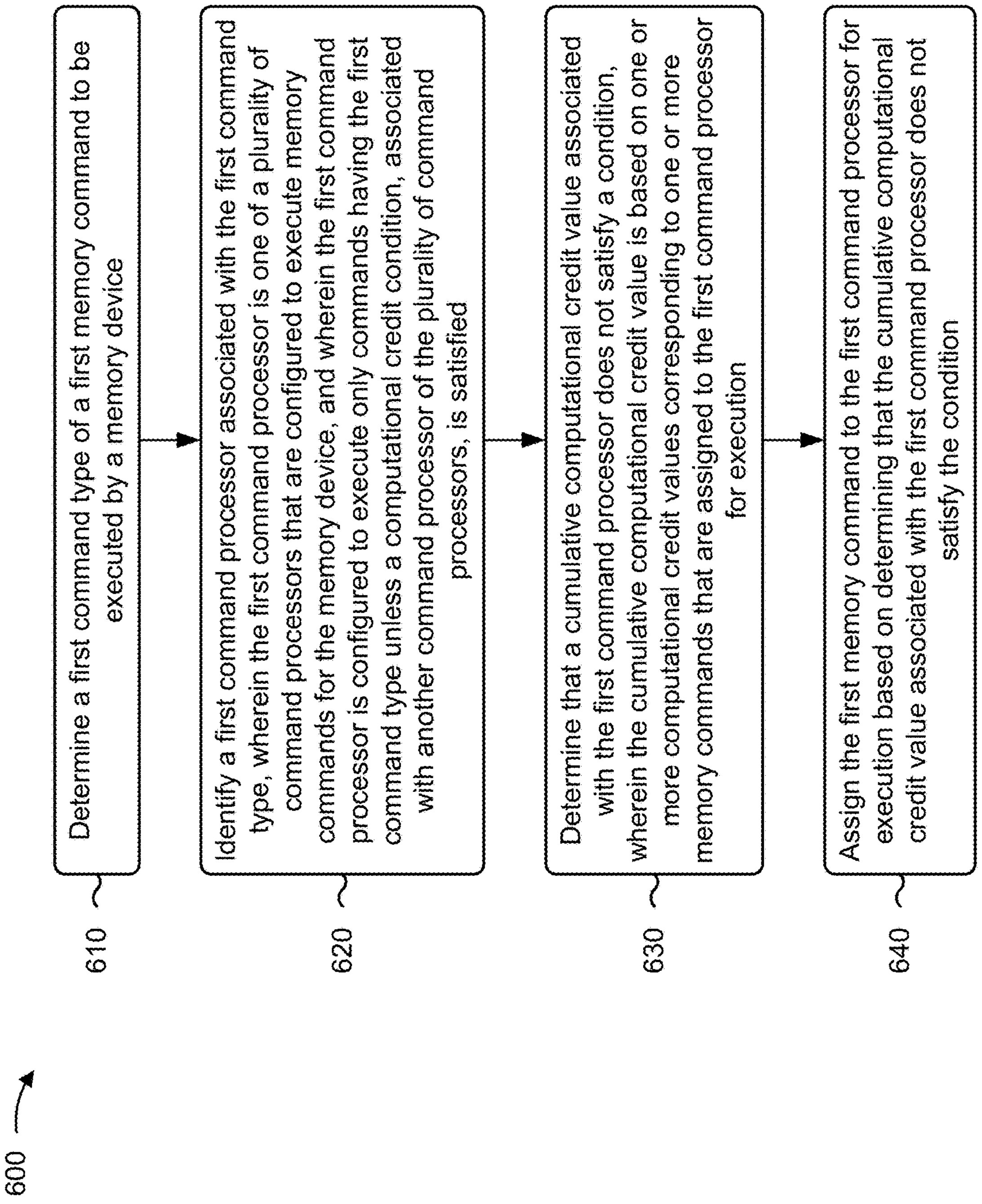
Figure 7:
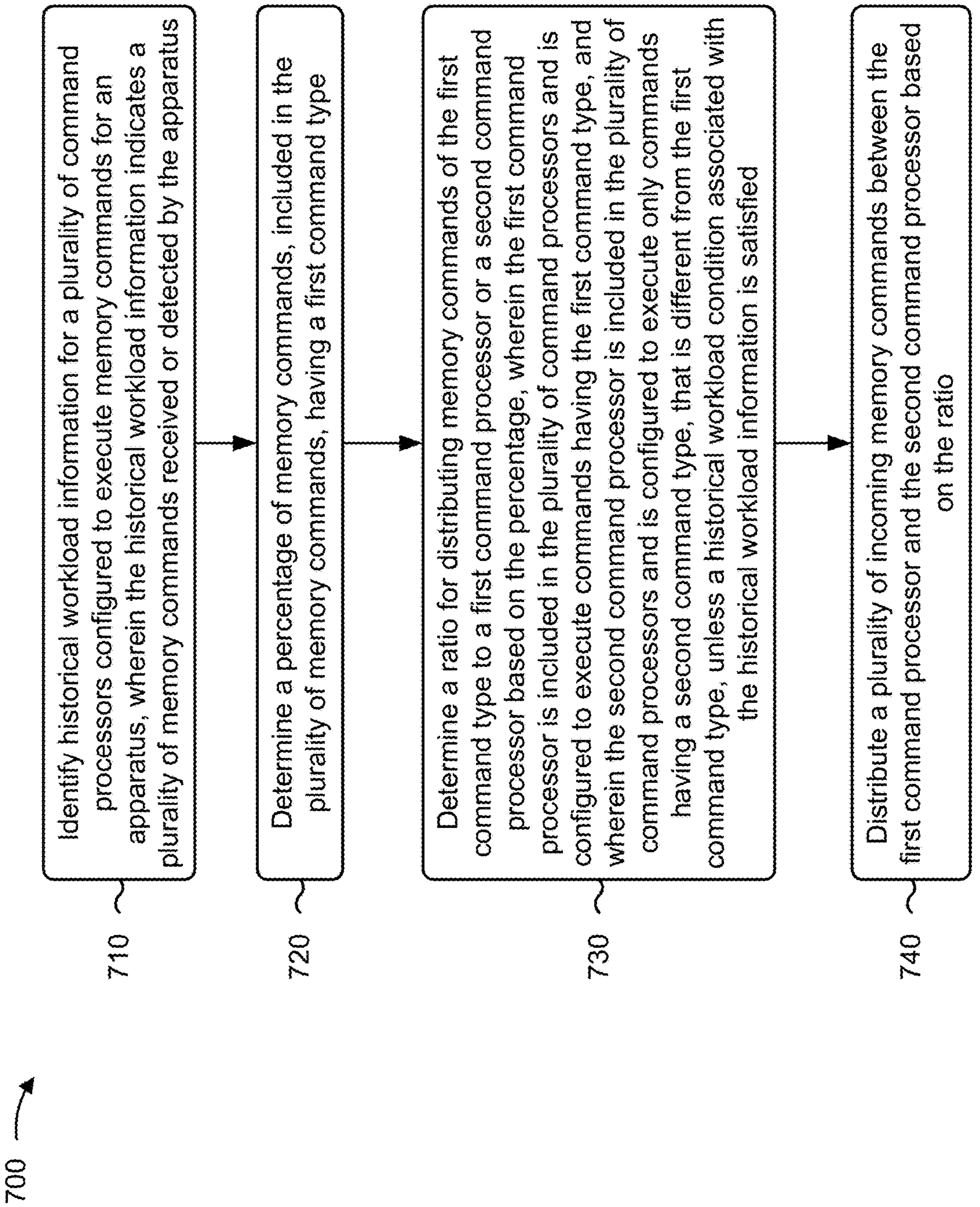

One or more devices or components shown in FIG. 2 may be configured to perform operations described elsewhere herein, such as one or more operations of FIGS. 3A-3D and/or 4A-4B and/or one or more process blocks of the methods of FIGS. 5-7. For example, the controller 130, one or more command processor 250, the memory management component 260, the command assignment component 270, and/or the workload determination component 280 may be configured to perform one or more operations and/or methods for the memory device 120.

The number and arrangement of components shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Additionally, or alternatively, a set of components (e.g., one or more components) shown in FIG. 2 may perform one or more operations described as being performed by another set of components shown in FIG. 2.

FIGS. 3A-3D are diagrams of an example 300 of memory command assignment based on command processor workload. The operations described in connection with FIGS. 3A-3D may be performed by the memory device 120 and/or one or more components of the memory device 120, such as the controller 130.

As shown by reference number 305, the controller 130 may detect a memory command, such as a read command, a write command, an erase command, or another type of command. As shown by reference number 305*a*, the memory command may be a host memory command. Alternatively, as shown by reference number 305*b*, the memory command may be a non-host memory command. A host memory command may be a memory command that is received from the host device 110 (e.g., via the host interface 150). A non-host memory command may be a memory command that is not received from the host device 110, such as a memory command generated by the memory device 120 and/or the controller 130 (e.g., for performing one or more internally-initiated operations).

As shown by reference number 310, the controller 130 may determine a memory command type of the memory command. Example memory command types include a read command (having a read command type), a host read command (having a host read command type), a non-host read command (having a non-host read command type), a write command (having a write command type), a host write command (having a host write command type), a non-host write command (having a non-host write command type), an aligned command (having an aligned command type), an aligned read command (having an aligned read command type), an aligned write command (having an aligned write command type), an unaligned command (having an unaligned command type), an unaligned read command (having an unaligned read command type), an unaligned write command (having an unaligned write command type), an erase command (having an erase command type), an FTL command (having an FTL command type), a garbage collection (GC) command (having a GC command type), a GC read command (having a GC read command type), a GC write command (having a GC write command type), a data integrity scan read command (having a data integrity scan read command type), an FTL command (having an FTL command type), an FTL read command (having an FTL read command type), an FTL write command (having an FTL write command type), a trim command (having a trim command type), a file system area (FSA) command (having an FSA command type), an FSA read command (having an FSA read command type), an FSA write command (having an FSA write command type), a redundant array of independent NAND (RAIN) write command (having a RAIN write command type), a non-read, non-write, non-erase command (having a non-read, non-write, non-erase command type), or another type of command (having another command type). In the example 300, the memory command is shown as "Command A" having "Command Type A." As an example, Command A may be a read command having a read command type.

A read command having a read command type may include a command to read data stored by the memory device 120 (e.g., in the memory 140). A host read command may include a command, received from the host device 110, to read data stored by the memory device 120. A non-host read command may include a command, not received from the host device 110 (e.g., generated internally by the memory device 120), to read data stored by the memory device 120. A non-host read command may include, for example, a GC read command, a data integrity scan read command, an FTL read command, or an FSA read command. A GC read command may include a command to read valid data from a first block of memory so that the valid data can be written to a second block of memory, such as prior to erasing the first block of memory. A data integrity scan read command may include a command to read data from memory for data verification and/or error checking. An FTL read command may include a command to read information from an address table (e.g., a physical address to logical address translation table, block address table, and/or a logical block address table). An FSA read command may include a command to read log data (e.g., a log file) from memory.

A write command (sometimes called a program command) may include a command to write (or program) data to the memory device 120 (e.g., in the memory 140). A host write command may include a command, received from the host device 110, to write data to the memory device 120. A non-host write command may include a command, not received from the host device 110 (e.g., generated internally by the memory device 120), to write data to the memory device 120. A non-host write command may include, for example, a GC write command, an FTL write command, a trim command, an FSA write command, or a RAIN write command. A GC write command may include a command to write valid data from a first block of memory to a second block of memory, such as prior to erasing the first block of memory. An FTL write command may include a command to write information to an address table. A trim command may include a command to write an indication, to an address table, that data stored at a memory address is invalid. An FSA write command may include a command to write log data (e.g., a log file) to memory. A RAIN write command may include a command to write RAIN parity bits to memory. An erase command may include a command to erase data stored by the memory device 120 (e.g., in the memory 140). In some cases, an erase command is considered a type of write command because an erase command writes an erase data state (e.g., a "1") to memory cells.

An aligned command may include a command to read data from or write data to memory, where a data transfer size of the data to be read or written matches a logical block address (LBA) size used by the memory device 120. For example, if the memory device 120 uses an LBA size of 4 kilobytes (e.g., for all LBAs or the requested LBAs), and if a read command requests that 4 kilobytes of data be read from memory, then the read command is an aligned read command. Similarly, if the memory device 120 uses an LBA size of 4 kilobytes, and if a write command requests that 4 kilobytes of data be written to memory, then the write command is an aligned write command.

An unaligned command may include a command to read data from or write data to memory, where a data transfer size of the data to be read or written does not match an LBA size used by the memory device 120. For example, if the memory device 120 uses an LBA size of 4 kilobytes, and if a read command requests that 512 bytes of data be read from memory, then the read command is an unaligned read command. Similarly, if the memory device 120 uses an LBA size of 4 kilobytes, and if a write command requests that 512 bytes of data be written to memory, then the write command is an unaligned write command. Unaligned commands (e.g., unaligned read commands and unaligned write commands) may be more computationally expensive than aligned commands (e.g., aligned read commands and aligned write commands) because additional operations need to be performed to read or write the smaller data transfer size (e.g., 512 bytes) from or to the larger LBA size (e.g., 4 kilobytes). For example, for an unaligned read command, the 512 bytes of data would need to be extracted from the 4 kilobytes of data after the 4 kilobytes of data is read.

A non-read, non-write, non-erase command is sometimes called an out-of-band (OOB) command. An OOB command may include a command for an operation that is not performed on a memory array of the memory device 120 (e.g., that does not write data to a memory array, does not read data from a memory array, and does not erase a memory array). For example, an OOB command may include a request to obtain a unique identifier of the memory device 120, a request for on-demand paging (ODP), a request to obtain a temperature of the memory device 120, and/or an administrative command (e.g., a request to get a feature or a request to set a feature).

As shown by reference number 315, the controller 130 may identify a primary command processor associated with the determined command type of the detected memory command, shown as primary command processor 250*a*. As described above in connection with FIG. 2, the primary command processor may be a dedicated command processor that is dedicated to processing commands having the determined command type. For example, the primary command processor may process only commands having the determined command type unless a workload condition (e.g., a computational credit condition and/or a historical workload condition) associated with another command processor 250 is satisfied. As an example, if the memory command is a read command, then the primary command processor may be a read-dedicated command processor that only processes (e.g., executes) read commands unless a workload condition associated with another command processor, such as a write-dedicated command processor, is satisfied. As another example, if the memory command is a write command, then the primary command processor may be a write-dedicated command processor that only processes (e.g., executes) write commands unless a workload condition associated with another command processor, such as a read-dedicated command processor, is satisfied.

A particular command processor 250 may be dedicated to a single command type described herein or may be dedicated to a group of command types described herein. Furthermore, a command type may be defined at various levels of granularity. For example, a command processor 250 may be dedicated to host read commands, in which case the command processor 250 does not execute non-host read commands (unless a workload condition is satisfied). As another example, a command processor 250 may be dedicated to read commands, which includes host read commands and non-host read commands. As yet another example, a command processor 250 may be dedicated to write commands and erase commands.

As shown by reference number 320, in addition to the primary command processor, the memory device 120 may include one or more secondary command processors, shown as secondary command processor 250*b*, secondary command processor 250*c*, and secondary command processor 250*d*. A secondary command processor is not associated with the determined command type of the detected memory command. For example, the secondary command processor may be a dedicated command processor that is dedicated to processing commands having one or more command types other than the determined command type. For example, a secondary command processor may process commands having the determined command type only if a workload condition (e.g., a computational credit condition and/or a historical workload condition) associated with another command processor 250 is satisfied. As an example, if the memory command is a read command, then the secondary command processor may be a write-dedicated command processor that only processes (e.g., executes) write commands unless a workload condition associated with another command processor, such as a read-dedicated command processor, is satisfied. As another example, if the memory command is a write command, then the secondary command processor may be a read-dedicated command processor that only processes (e.g., executes) read commands unless a workload condition associated with another command processor, such as a write-dedicated command processor, is satisfied.

Thus, in some implementations, a primary command processor is configured to execute only commands having a first command type unless a first workload condition is satisfied. In some implementations, the first workload condition is a first computational credit condition associated with another command processor 250 (e.g., other than the primary command processor), such as a cumulative computational credit value associated with the other command processor 250 (e.g., other than the primary command processor) satisfying a threshold, as described in more detail below. Additionally, or alternatively, the first workload condition may be a first historical workload condition, as described below in connection with FIGS. 4A-4B. Similarly, a secondary command processor may be configured to execute only commands having a second command type (e.g., different from the first command type) unless a second workload condition is satisfied. In some implementations, the second workload condition is a second computational credit condition associated with another command processor 250 (e.g., other than the secondary command processor, such as the primary command processor), such as a cumulative computational credit value associated with the other command processor 250 (e.g., other than the secondary command processor, such as the primary command processor) satisfying a threshold, as described in more detail below. Additionally, or alternatively, the second workload condition may be a second historical workload condition, as described below in connection with FIGS. 4A-4B.

Figure 3A:
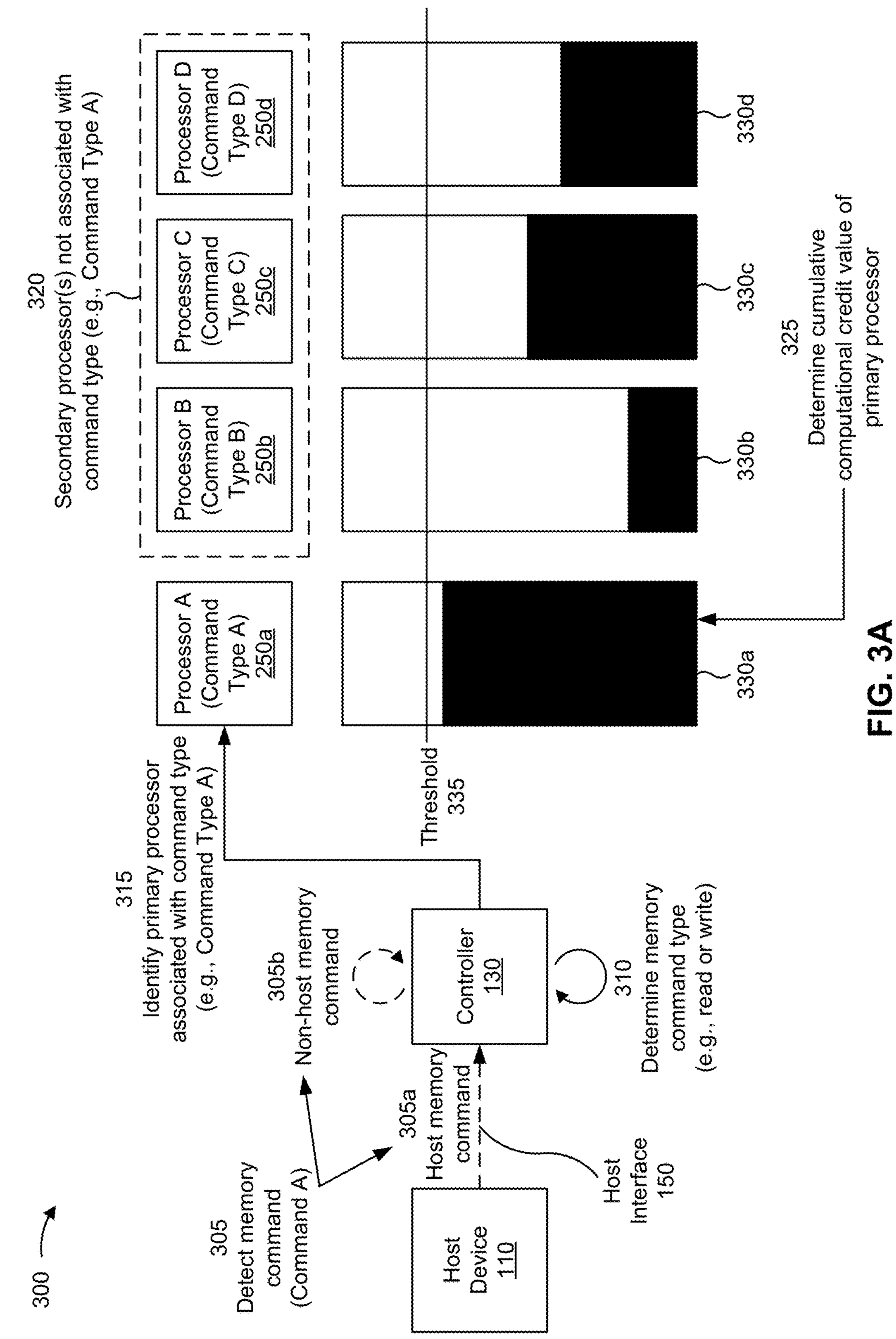
FIGS. 3A-3D are diagrams of an example of memory command assignment based on command processor workload.

In the example 300 of FIG. 3A, the controller 130 identifies a primary command processor 250*a*, shown as "Processor A." For example, the primary command processor 250*a* (sometimes called a first command processor) may be dedicated to a first command type, the secondary command processor 250*b* (sometimes called a second command processor) may be dedicated to a second command type, the secondary command processor 250*c* (sometimes called a third command processor) may be dedicated to a third command type, and the secondary command processor 250*d* (sometimes called a fourth command processor) may be dedicated to a fourth command type. Although four command processors 250 are shown in FIG. 3A, the memory device 120 may include a different quantity of command processors 250, such as two command processors 250, three command processors 250, or more than four command processors 250. In some implementations where the memory device 120 includes two (or more) command processors 250, a first command processor 250 may be dedicated to a first command type (e.g., one of a read command type or a write command type), and a second command processor 250 may be dedicated to a second command type (e.g., the other of the read command type or the write command type).

As shown by reference number 325, in some implementations, the controller 130 may determine a cumulative computational credit value associated with the identified primary command processor 250*a*. As described in more detail below in connection with FIG. 3B, the cumulative computational credit value of a particular command processor 250 may be based on all of the memory commands that are assigned to (e.g., and that have not yet been executed by) that particular command processor 250. In some implementations, each command processor 250 may be associated with a respective cumulative computational credit value, such as a first cumulative computational credit value 330*a* associated with the first command processor 250*a*, a second cumulative computational credit value 330*b* associated with the second command processor 250*b*, a third cumulative computational credit value 330*c* associated with the third command processor 250*c*, and a fourth cumulative computational credit value 330*d* associated with the fourth command processor 250*d*. The controller 130 may determine whether to assign the detected memory command to the primary command processor 250*a* based on whether the cumulative computational credit value for the primary command processor 250*a* (e.g., the first cumulative computational credit value 330*a*) satisfies a threshold 335.

Figure 3B:
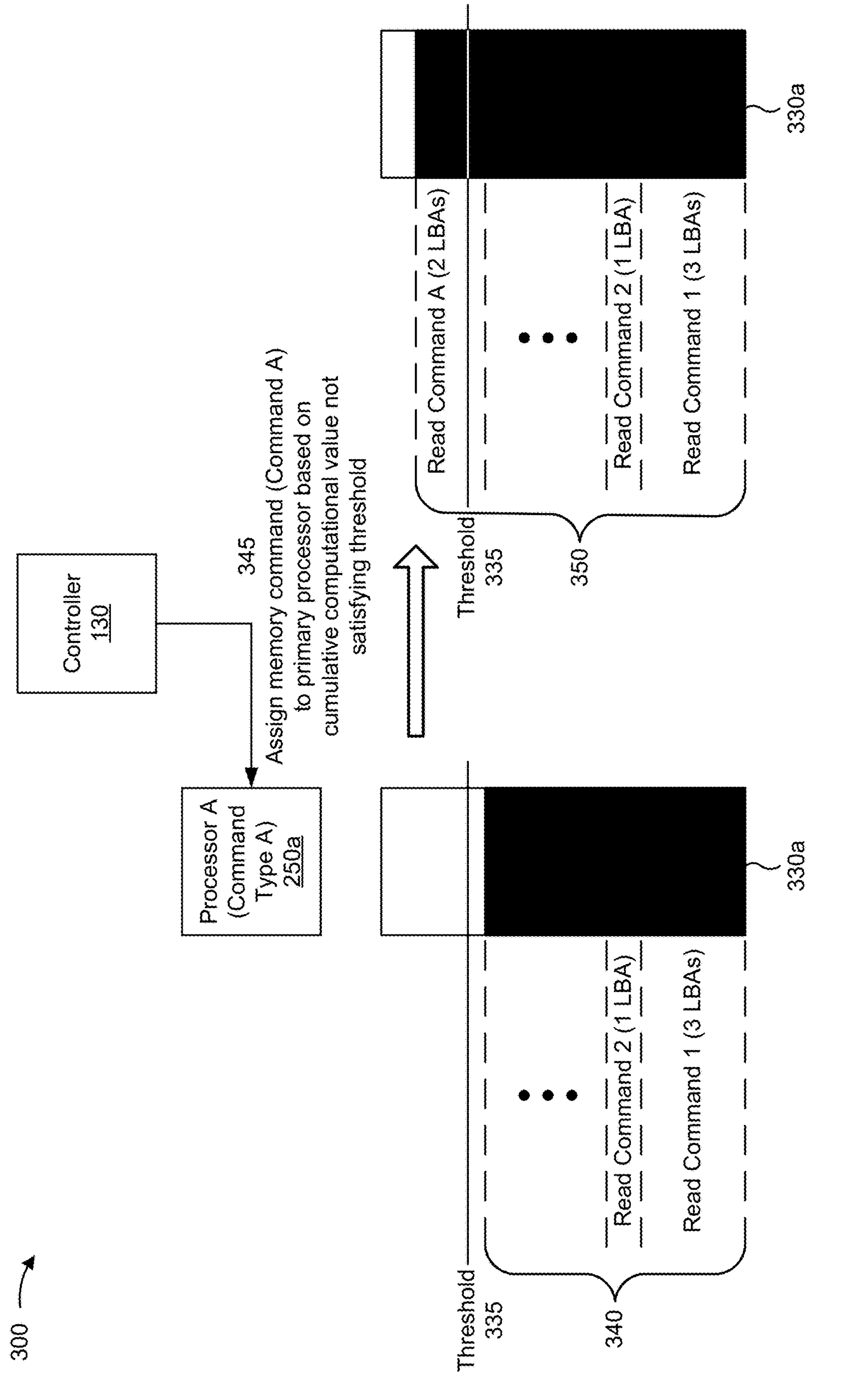

As shown in FIG. 3B, and by reference number 340, the cumulative computational credit value of the primary command processor 250*a* may be based on all of the memory commands that are assigned to (e.g., and that have not yet been executed by) the primary command processor 250*a*. For example, a memory command may be associated with a computational credit value, which may be based on a command type of the memory command and/or a data transfer size associated with the memory command. The cumulative computational credit value of a command processor 250 may be based on all computational credit values corresponding to all memory commands that are assigned to that command processor 250 for execution (e.g., and that have not yet been executed). For example, the cumulative computational credit value of a command processor 250 may represent a combination of all computational credit values corresponding to all memory commands that are assigned to that command processor 250, such as a sum of all of those computational credit values.

As an example, and as shown in FIG. 3B, the primary command processor 250*a* has been assigned a first read command, shown as "Read Command 1," that includes a request to read data from three logical block addresses (LBAs) of memory. As further shown, the primary command processor 250*a* has also been assigned a second read command, shown as "Read Command 2," that includes a request to read data from one LBA of memory. The primary command processor 250*a* may also be assigned one or more other memory commands, and the cumulative computational credit value 330*a* of the primary command processor 250*a* may be a sum of the computational credit values of the memory commands assigned to the primary command processor 250*a*. As shown in FIG. 3B, the cumulative computational credit value 330*a* of the primary command processor 250*a* is less than a threshold 335 (sometimes called a computational credit threshold or a cumulative computational credit threshold).

As indicated above, a computational credit value associated with a memory command may be based on a command type of the memory command and/or a data transfer size associated with the memory command. In some implementations, the computational credit value may be based on a command type of the memory command regardless of the data transfer size associated with the memory command, which may reduce complexity and conserve processing resources of the controller 130. For example, a read command type may be associated with a computational credit value of one, regardless of the data transfer size. In this case, the first read command ("Read Command 1") may be associated with a computational credit value of one, and the second read command ("Read Command 2") may also be associated with a computational credit value of one even though the second read command has a larger data transfer size (e.g., 3 LBAs) compared to the data transfer size of the first read command (e.g., 1 LBA).

In some implementations, the computational credit value associated with a memory command may be based on a data transfer size associated with the memory command regardless of the command type associated with the memory command, which may reduce complexity and conserve processing resources of the controller 130. The data transfer size may be indicated in the memory command, such as an indication of a quantity of LBAs associated with the memory command (e.g., a quantity of LBAs from which data is to be read or to which data is to be written). Additionally, or alternatively, the data transfer size may be based on a storage size associated with the quantity of LBAs indicated in the memory command (e.g., 4 kilobytes, 8 kilobytes, 1 megabyte, or 2 megabytes). As an example, the computational credit value of a memory command may be based on the number of LBAs indicated in the memory command. In this case, the first read command ("Read Command 1") may be associated with a computational credit value of three (e.g., based on a request to read data from three LBAs), and the second read command ("Read Command 2") may be associated with a computational credit value of one (e.g., based on a request to read data from one LBA). In some implementations, the computational credit value associated with a memory command is indicative of or based on a computational complexity of executing that memory command. Thus, a command associated with a greater data transfer size may be associated with a computational credit value that is greater in magnitude than a computational credit value associated with a command associated with a smaller data transfer size (e.g., because a command associated with a greater data transfer size may be more computationally expensive than a command associated with a smaller data transfer size).

In some implementations, the computational credit value associated with a memory command may be based on both a command type of the memory command and a data transfer size associated with the memory command. In some implementations, different memory command types may be associated with different computational credit values. As an example, a first command type may be associated with a first computational credit value, and a second command type may be associated with a second computational credit value that is different from the first computational credit value. For example, a write command type may be associated with a computational credit value that is greater in magnitude than a computational credit value associated with the read command type (e.g., because a write command may be more computationally expensive than a read command). As an example, a write command type may be associated with a computational credit value of two, and a read command type may be associated with a computational credit value of one.

In some implementations, a read command type may be associated with a lower magnitude computational credit value than a write command type (e.g., because a read command is less computationally expensive than a write command), and/or a trim command type may be associated with a lower magnitude computational credit value than the write command type and the read command type (e.g., because a trim command is less computationally expensive than both a read command and a write command). Additionally, or alternatively, an unaligned read command type may be associated with a lower magnitude computational credit value than an unaligned write command type (e.g., because an unaligned read command is less computationally expensive than an unaligned write command), an aligned write command type may be associated with a lower magnitude computational credit value than the unaligned write command type (e.g., because an aligned command is less computationally expensive than an unaligned command), and/or an aligned read command type may be associated with a lower magnitude computational credit value than the unaligned read command type and the aligned write command type (e.g., because an aligned command is less computationally expensive than an unaligned command and a read command is less computationally expensive than a write command).

In some implementations, a type-based computational credit value (e.g., that is based on the command type) of a memory command may be combined with a size-based computational credit value (e.g., that is based on the data transfer size) of the memory command to determine a total computational credit value for the memory command. As an example, the controller 130 may add the type-based computational credit value of a memory command and the size-based computational credit value of the memory command to determine the total computational credit value for the memory command. In this case, the first read command may be associated with a computational credit value of four based on the first read command being a read command (e.g., having a type-based computational credit value of one) and being associated with a data transfer size of three LBAs (e.g., having a size-based computational credit value of three), and the second read command may be associated with a computational credit value of two based on the second read command being a read command (e.g., having a type-based computational credit value of one) and being associated with a data transfer size of one LBA (e.g., having a size-based computational credit value of one).

Alternatively, the controller 130 may multiply the type-based computational credit value of a memory command and the size-based computational credit value of the memory command to determine the total computational credit value for the memory command. In this case, the first read command may be associated with a computational credit value of three based on the first read command being a read command (e.g., having a type-based computational credit value of one) and being associated with a data transfer size of three LBAs (e.g., having a size-based computational credit value of three), and the second read command may be associated with a computational credit value of one based on the second read command being a read command (e.g., having a type-based computational credit value of one) and being associated with a data transfer size of one LBA (e.g., having a size-based computational credit value of one).

As shown by reference number 345, the controller 130 may assign the memory command to the primary command processor 250*a* based on a determination that the cumulative computational credit value 330*a* of the primary command processor 250*a* does not satisfy the threshold 335 (e.g., is less than or equal to the threshold 335). In other words, the controller 130 may assign the memory command to the primary command processor 250*a* based on a workload condition associated with the primary command processor 250*a* not being satisfied. In the example 300, the workload condition is whether the cumulative computational credit value satisfies the threshold 335. In this case, the workload condition may be called a computational credit condition. In example 300, the workload condition (and the computational credit condition) is not satisfied because the cumulative computational credit value does not satisfy the threshold 335.

As shown by reference number 350, the controller 130 may modify the cumulative computational credit value 330*a* associated with the primary command processor 250*a* based on assigning the memory command to the primary command processor 250*a*. For example, the controller 130 may modify the cumulative computational credit value 330*a* based on a computational credit value associated with the assigned memory command. In the example 300, the assigned memory command is a read command, shown as "Read Command A," that includes a request to read data from two LBAs of memory. The controller 130 may determine a new cumulative computational credit value (sometimes called a modified cumulative computational credit value or an updated cumulative computational credit value) based on the previous cumulative computational credit value and the computational credit value associated with the assigned memory command. For example, the controller 130 may combine (e.g., add) the previous cumulative computational credit value and the computational credit value associated with the assigned memory command.

Figure 3C:
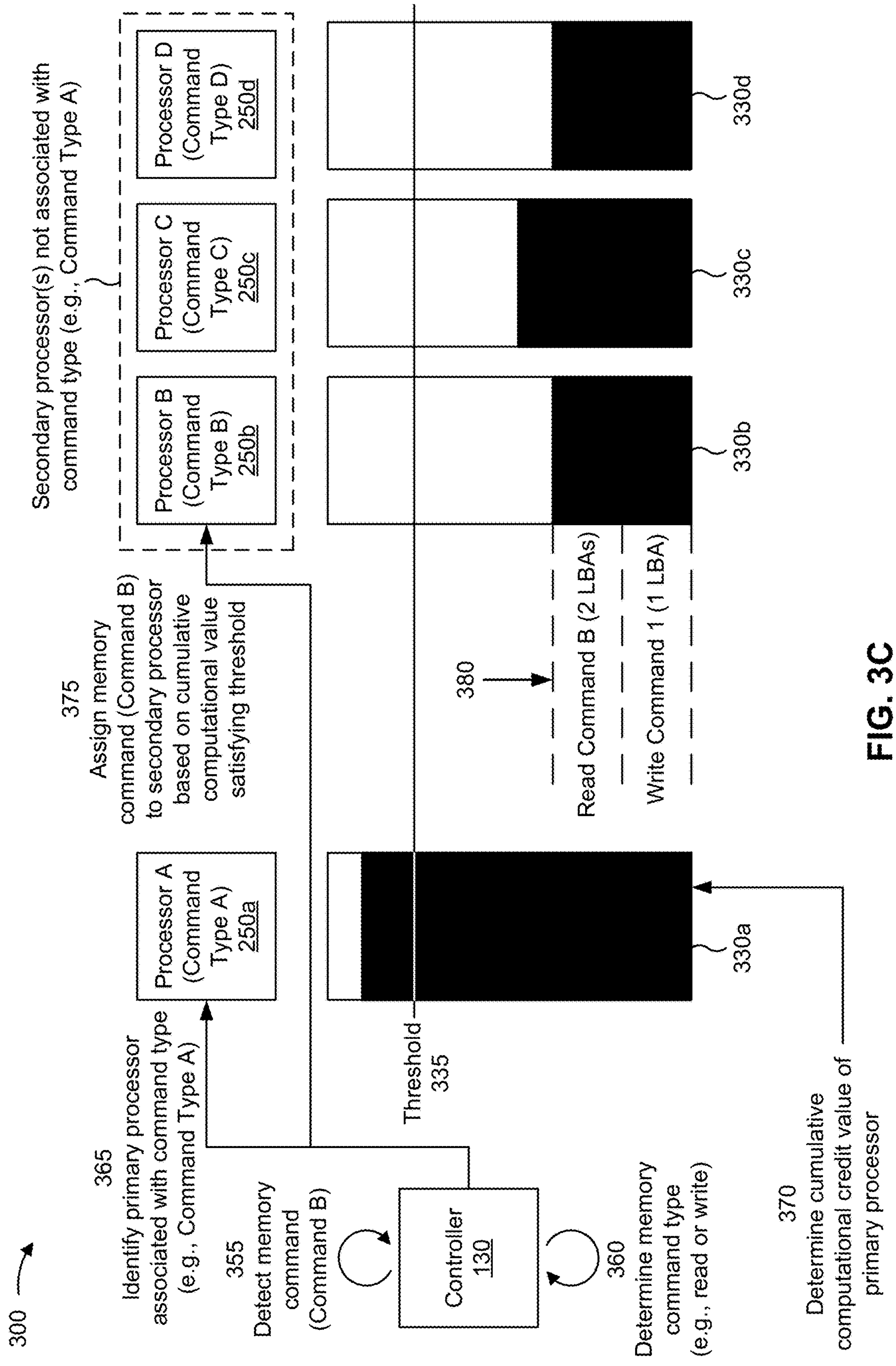

In some cases, assigning a memory command to a command processor 250 and modifying the cumulative computational credit value associated with that command processor 250 may cause the cumulative computational credit value to satisfy the threshold 335 (e.g., be greater than or equal to the threshold 335), as shown in FIG. 3B. FIG. 3C shows an example of assigning a memory command to a command processor 250 when the threshold 335 is satisfied.

As shown in FIG. 3C, and by reference number 355, the controller 130 may detect a memory command, as described above in connection with reference number 305 of FIG. 3A. For example, the memory command described above in connection with reference number 305 may be a first memory command detected earlier in time, and the memory command detected in connection with reference number 355 may be a second memory command detected later in time. For example, the controller 130 may detect the second memory command after the first memory command has been assigned to the primary command processor 250*a*, causing the threshold 335 to be exceeded by a cumulative computational credit value 330*a* associated with the primary command processor 250*a*.

As shown by reference number 360, the controller 130 may determine a memory command type of the second memory command, as described above in connection with reference number 310 of FIG. 3A. In the example 300, the second memory command has a same command type as the first memory command. In the example 300, the first memory command is shown as "Command A" having "Command Type A," and second memory command is shown as "Command B," also having "Command Type A." As an example, the first memory command and the second memory command may both be read commands having a read command type.

As shown by reference number 365, the controller 130 may identify a primary command processor associated with the determined command type of the second memory command, as described above in connection with reference number 315 of FIG. 3A. In the example 300 of FIG. 3C, the controller 130 identifies a primary command processor 250*a*, shown as "Processor A," as the command processor 250 associated with the determine command type (e.g., a read command).

As shown by reference number 370, the controller 130 may determine a cumulative computational credit value associated with the identified primary command processor 250*a*, as described above in connection with reference number 325 of FIG. 3A. For example, the controller 130 may determine a current cumulative computational credit value for the primary command processor 250*a* (e.g., the cumulative computational credit value associated with the primary command processor 250*a* at a time when the controller 130 is determining a command processor to which the memory command is to be assigned). As shown, the controller 130 may determine that the cumulative computational credit value 330*a* associated with the primary command processor 250*a* satisfies the threshold 335 (e.g., after assignment of the first memory command to the primary command processor 250*a*, as described above in connection with FIG. 3B).

As shown by reference number 375, the controller 130 may assign the second memory command to a secondary command processor (e.g., and not the primary command processor 250*a*) based on a determination that the cumulative computational credit value 330*a* of the primary command processor 250*a* satisfies the threshold 335 (e.g., is greater than or equal to the threshold 335). In other words, the controller 130 may assign the memory command to a secondary command processor based on a workload condition associated with the primary command processor 250*a* being satisfied. In the example 300, the workload condition is whether the cumulative computational credit value satisfies the threshold 335. In this case, the workload condition may be called a computational credit condition. In example 300, the workload condition (and the computational credit condition) is satisfied because the cumulative computational credit value satisfies the threshold 335.

If the memory device 120 includes a single secondary command processor, then the controller 130 may assign the second memory command to that single secondary command processor. However, if the memory device 120 includes multiple secondary command processors (e.g., the second command processor 250*b*, the third command processor 250*c*, and the fourth command processor 250*d*, as shown), then the controller 130 may select a secondary command processor, of the multiple secondary command processors, to process (e.g., execute) the second memory command. In some implementations, the controller 130 selects a default secondary command processor. The default secondary command processor may be a secondary command processor that handles all overflow memory commands when a workload condition is satisfied (e.g., for any primary command processor) or a secondary command processor that handles overflow memory commands for a particular primary command processor if a workload condition for that particular primary command processor is satisfied. For example, a first pair of command processors may be configured to handle overflow memory command from one another, a second pair of command processors may be configured to handle overflow memory commands from one another, and so on.

As another example, the second command processor 250*b* may handle overflow memory commands for the first command processor 250*a*, the third command processor 250*c* may handle overflow memory commands for the second command processor 250*b*, the fourth command processor 250*d* may handle overflow memory commands for the third command processor 250*c*, and the first command processor 250*a* may handle overflow memory commands for the fourth command processor 250*d*. A similar "cascading" configuration may be used for a different number of command processors 250 other than four. An "overflow memory command" is a memory command that is not assigned to a particular command processor because the cumulative computational credit value for that particular command processor satisfies a threshold.

In some implementations, the controller 130 may select a secondary command processor having the smallest cumulative computational credit value among all secondary command processors. Additionally, or alternatively, the controller 130 may select a secondary command processor having the greatest difference, among all secondary command processors, between the cumulative computational credit value of that secondary command processor and the threshold 335 associated with that secondary command processor. In this way, the controller 130 may balance a workload across command processors, thereby reducing latency. Although a single threshold 335 (e.g., a common threshold) is shown in example 300 as being associated with all of the command processors (e.g., the primary command processor and all secondary command processors), in some implementations, each command processor may be associated with a different threshold (or at least one command processor may be associated with a different threshold than at least one other command processor).

In the example 300 of FIG. 3C, the controller 130 assigns the second memory command to the secondary command processor 250*b*. Thus, the controller 130 may selectively assign a memory command to a primary command processor or a secondary command processor based on whether a workload condition is satisfied (e.g., based on whether the cumulative computational credit value for the primary command processor satisfies a threshold). As used herein, "selectively assigning" a memory command to a primary command processor or a secondary command processor means to either assign the memory command to the primary command processor or assign the memory command to the secondary command processor. For example, selectively assigning a memory command to a primary command processor or a secondary command processor based on a condition (e.g., a workload condition or a computational credit condition) means that the memory command is assigned to the primary command processor if the condition is not satisfied and the memory command is assigned to the secondary command processor if the condition is satisfied (or vice versa). Thus, "selectively assigning" a memory command may include determining whether to assign the memory command to a primary command processor or a secondary command processor and then assigning the memory command to either the primary command processor or the secondary command processor based on that determination.

As shown by reference number 380, the controller 130 may modify the cumulative computational credit value 330*b* associated with the secondary command processor 250*b* based on assigning the second memory command to the secondary command processor 250*b*, in a similar manner as described above in connection with reference number 350 of FIG. 3B. For example, the controller 130 may modify the current cumulative computational credit value 330*b* (e.g., the cumulative computational credit value at a time when the controller 130 is determining a command processor to which the memory command is to be assigned) based on a computational credit value associated with the second memory command. In the example 300, the second memory command is a read command, shown as "Read Command B," that includes a request to read data from two LBAs of memory. The controller 130 may determine a new cumulative computational credit value (sometimes called a modified cumulative computational credit value or an updated cumulative computational credit value) based on the previous cumulative computational credit value and the computational credit value associated with the second memory command. For example, the controller 130 may combine (e.g., add) the previous cumulative computational credit value and the computational credit value associated with the assigned memory command.

In the example 300 of FIG. 3C, a write command assigned to the secondary command processor 250*b* (which may be a write-dedicated command processor) is shown as requesting one LBA. The write command ("Write Command 1") and the read command ("Read Command B") are shown as having the same computational credit value despite the write command requesting a smaller quantity of LBAs than the read command. This is because in some implementations, a write command may be associated with a greater computational credit value than a read command due to write commands being more computationally complex than read commands, as described above.

Figure 3D:
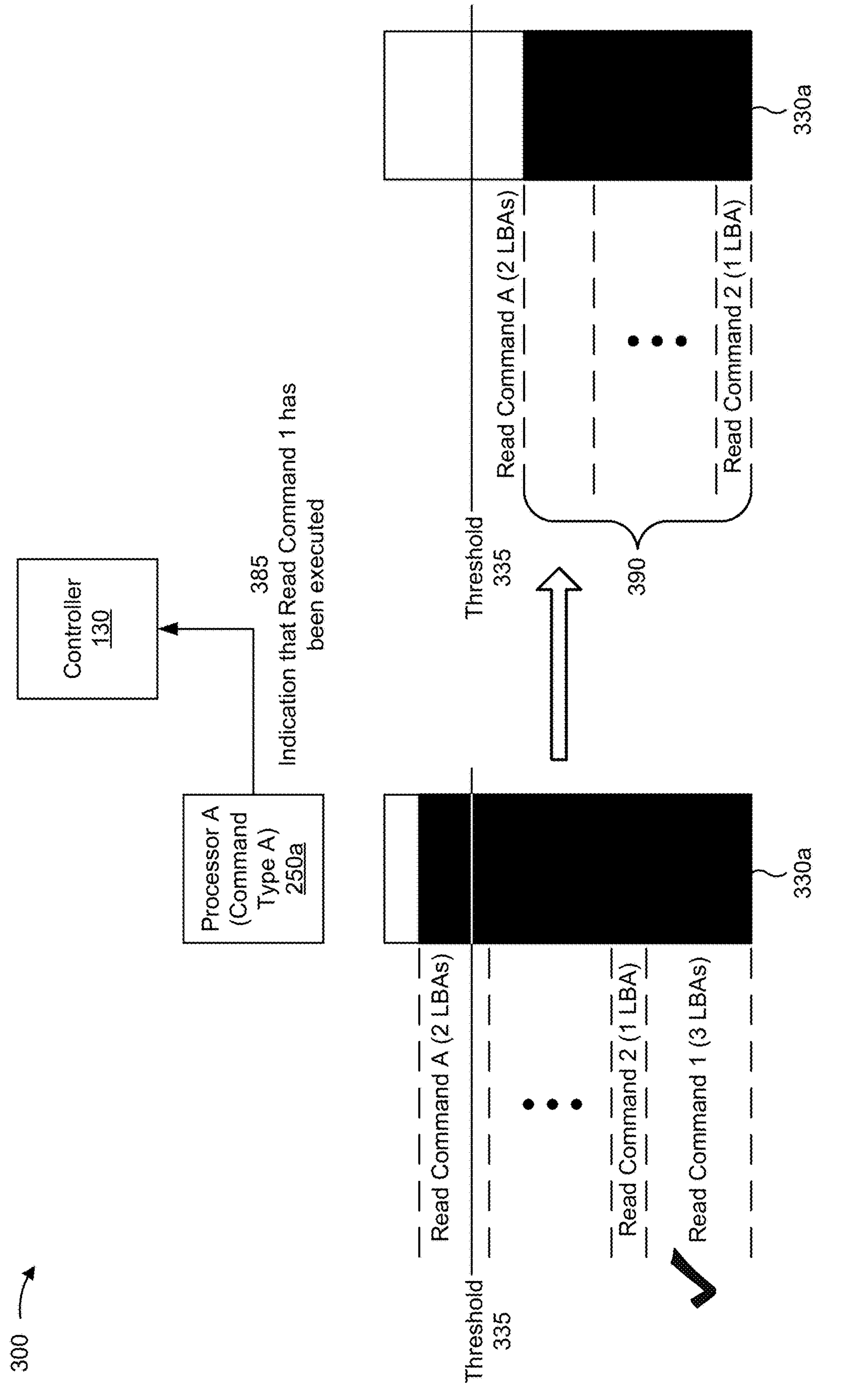

As shown in FIG. 3D, and by reference number 385, in some implementations, the controller 130 may determine that an assigned memory command has been executed, such as by receiving an indication when an assigned memory command has been executed (e.g., when execution of the assigned memory command is complete). For example, a command processor 250 may notify the controller 130 when a memory command has been executed. In some implementations, the command processor 250 may indicate a command identifier (e.g., a command tag) that identifies the executed memory command. The controller 130 may use the command identifier to identify the memory command that has been executed.

As shown by reference number 390, the controller 130 may remove a computational credit value, associated with the executed memory command, from a cumulative computational credit value associated with the command processor 250 that executed the memory command (e.g., a command processor 250 from which the indication was received).

As an example, the primary command processor 250*a* may indicate, to the controller 130, that a memory command shown as "Read Command 1" has been executed. The controller 130 may then remove a computational credit value, associated with "Read Command 1," from the cumulative computational credit value 330*a* associated with the primary command processor 250*a*. As shown, this may cause the cumulative computational credit value 330*a* to no longer satisfy the threshold 335 (e.g., to fall below the threshold 335). Thus, if the controller 130 detects a subsequent memory command (e.g., a third memory command) associated with the primary command processor 250*a*, then the controller 130 may assign the subsequent memory command to the primary command processor 250*a* (e.g., based on further updating the cumulative computational credit value to remove the computational credit value associated with "Read Command 1").

In this way, the memory device 120 may enable a performance requirement (e.g., an IOPS requirement) to be satisfied and/or may enable performance of the memory device 120 to be improved (e.g., to reduce latency) without the need to add additional dedicated processors to the memory device 120. Furthermore, the memory device 120 described herein improves performance by better utilizing command processor resources without increasing manufacturing costs or increasing power consumption.

As indicated above, FIGS. 3A-3D are provided as examples. Other examples may differ from what is described with regard to FIGS. 3A-3D.

Figure 4A:
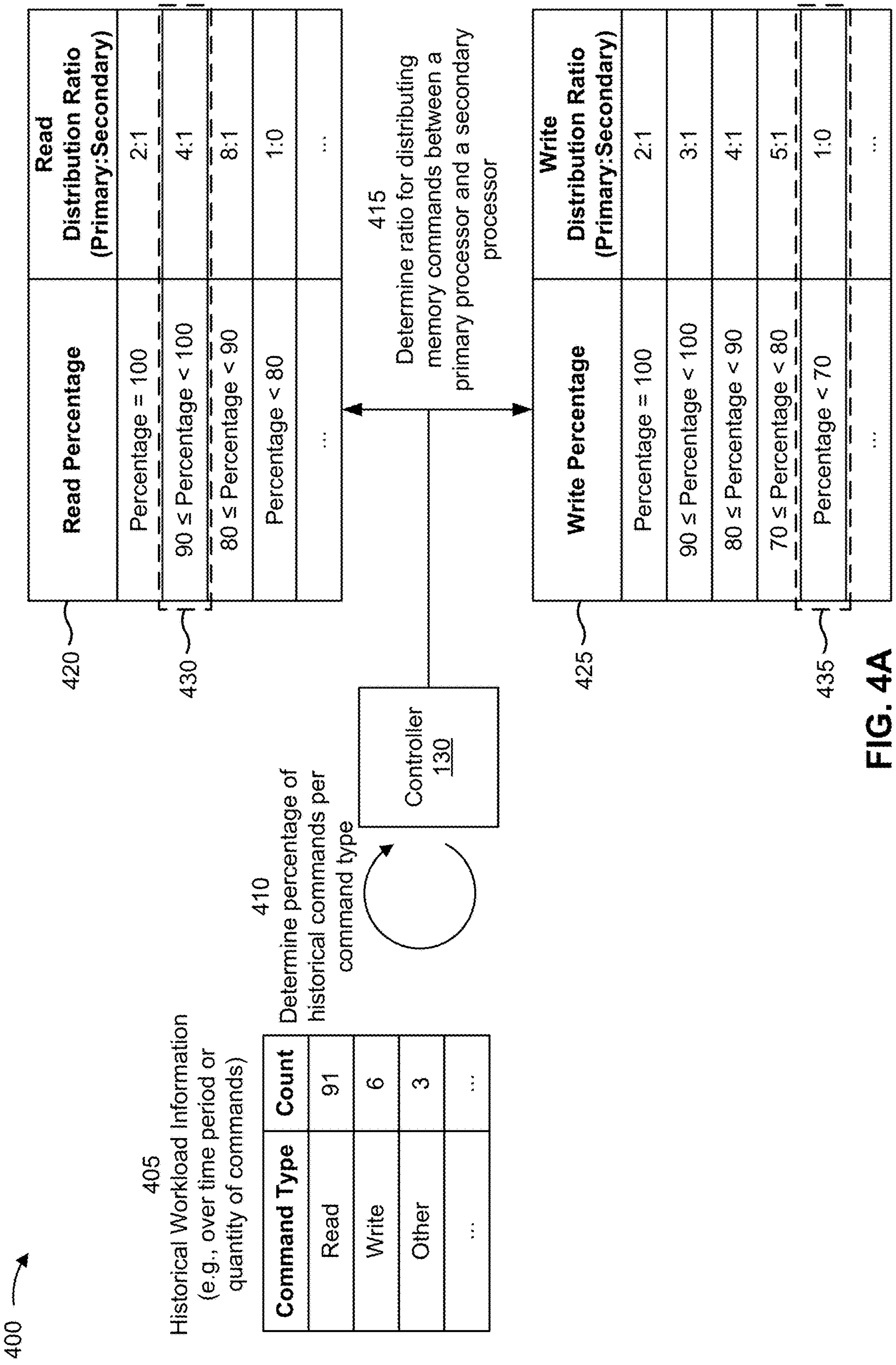
FIGS. 4A-4B are diagrams of another example of memory command assignment based on command processor workload.
Figure 4B:
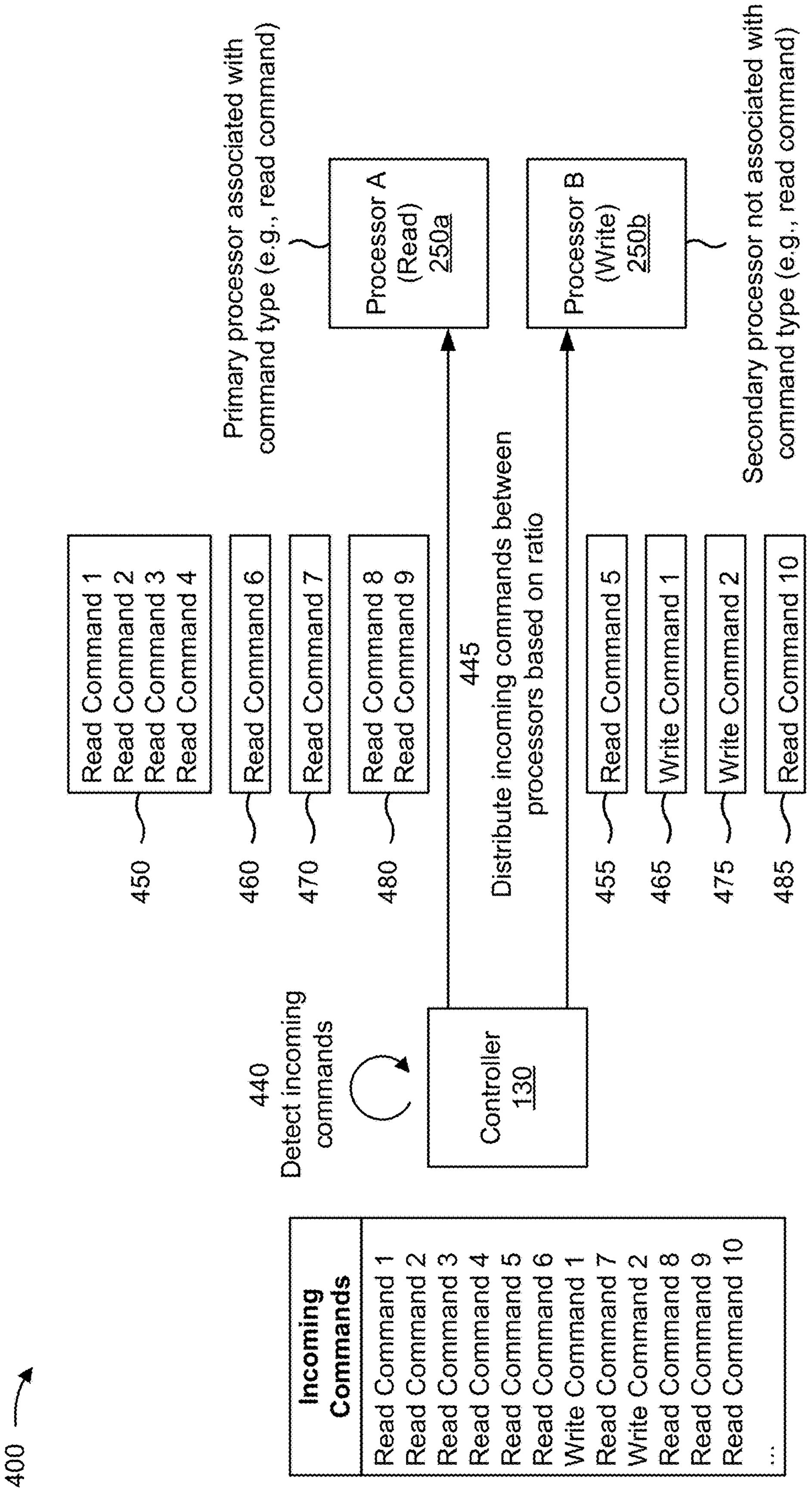

FIGS. 4A-4B are diagrams of an example 400 of memory command assignment based on command processor workload. The operations described in connection with FIGS. 4A-4B may be performed by the memory device 120 and/or one or more components of the memory device 120, such as the controller 130 and/or one or more components of the controller 130.

As shown by reference number 405, the controller 130 may identify historical workload information associated with the memory device 120. The historical workload information may include information related to a historical workload of the memory device 120, such as memory commands that have been received and/or processed (e.g., executed) by the memory device 120. For example, the historical workload information may indicate commands that were processed (e.g., executed) by any command processor 250 included in the memory device 120. In some implementations, the historical workload information may indicate one or more command types of commands that were received, detected, or processed within a historical time period (e.g., the most recent 250 milliseconds) and/or may indicate one or more command types for a particular quantity of the most recently received, detected, or processed commands (e.g., the most recent 100 commands).

In some implementations, the historical workload information may indicate a first quantity of memory commands of a first command type that were received, detected, assigned, or executed (e.g., within a historical time period or within a particular quantity of most recent commands), a second quantity of memory commands of a second command type that were received, detected, or executed (e.g., within the historical time period or within the particular quantity of most recent commands), and so on. As an example, and as shown in FIG. 4A, the historical workload information may indicate a quantity (e.g., a count) of historical read commands, a quantity of historical write commands, and/or a quantity of other historical commands. In the example 400 of FIG. 4, the historical workload information indicates that 91 read commands, 6 write commands, and 3 other commands (e.g., non-read and non-write commands) were detected and/or executed in a historical time period (e.g., associated with a time window or a quantity of commands). These command types are provided as examples, and the historical workload information may include information for one or more other types of commands, such as the command types described above in connection with FIGS. 3A-3D.

As shown by reference number 410, the controller 130 may determine a percentage of historical memory commands, included in multiple historical memory commands indicated in the historical workload information, corresponding to a command type. For example, the controller 130 may determine a first percentage of historical memory commands having a first command type, a second percentage of historical memory commands having a second command type, and so on. In some implementations, the controller 130 may determine a single percentage for a single command type (e.g., read commands). Alternatively, the controller 130 may determine multiple percentages corresponding to multiple command types (e.g., a read percentage for read commands, a write percentage for write commands, and so on).

As shown by reference number 415, the controller 130 may determine a ratio for distributing memory commands (e.g., of a particular command type) to a first command processor or a second command processor. This ratio is sometimes called a "distribution ratio." In some implementations, the controller 130 may determine the distribution ratio based on the percentage. For example, the controller 130 may determine a distribution ratio for distributing read commands to a primary command processor for read commands (e.g., a read-dedicated command processor) or a secondary command processor (e.g., a write-dedicated command processor) based on the percentage of read commands indicated in the historical workload information. Additionally, or alternatively, the controller 130 may determine a distribution ratio for distributing write commands to a primary command processor for write commands (e.g., a write-dedicated command processor) or a secondary command processor (e.g., a read-dedicated command processor) based on the percentage of write commands indicated in the historical workload information. More generally, the controller 130 may determine a distribution ratio for distributing commands of a particular command type to a primary command processor (e.g., dedicated to that particular command type) or a secondary command processor (e.g., not dedicated to that particular command type) based on the percentage of commands of that particular command type indicated in the historical workload information.

In some implementations, the memory device 120 may store a data structure (e.g., a table) in memory 140. The table may include multiple entries, where each entry indicates a particular percentage (e.g., 100%) or a range of percentages (e.g., 90% to 100%, 80% to 90%, or less than 80%) and a particular distribution ratio corresponding to that particular percentage or that range of percentages. The controller 130 may identify the distribution ratio by looking up a determined percentage in the table and identifying a distribution ratio corresponding to that percentage.

As an example, a first table 420 (e.g., a read distribution ratio table) indicates a 2:1 distribution ratio for a read percentage equal to 100%, a 4:1 distribution ratio for a read percentage less than 100% and greater than or equal to 90%, an 8:1 distribution ratio for a read percentage less than 90% and greater than or equal to 80%, and a 1:0 distribution ratio for a read percentage less than 80%. A 2:1 distribution ratio for read commands means that one read command is assigned to a non-read-dedicated command processor (e.g., a secondary command processor) for every two read commands assigned to a read-dedicated command processor (e.g., a primary command processor), a 4:1 distribution ratio for read commands means that one read command is assigned to a non-read-dedicated command processor for every four read commands assigned to a read-dedicated command processor, and so on. A 1:0 distribution ratio for read commands means that all read commands are assigned to a read-dedicated command processor (e.g., and no read commands are assigned to a non-read-dedicated command processor).

As another example, a second table 425 (e.g., a write distribution ratio table) indicates a 2:1 distribution ratio for a write percentage equal to 100%, a 3:1 distribution ratio for a write percentage less than 100% and greater than or equal to 90%, a 4:1 distribution ratio for a write percentage less than 90% and greater than or equal to 80%, a 5:1 distribution ratio for a write percentage less than 80% and greater than or equal to 70%, and a 1:0 distribution ratio for a write percentage less than 70%. Thus, in some implementations, different command types may be associated with different distribution tables and different correspondences between percentages (or ranges of percentages) and distribution ratios. However, in some implementations, the same table and/or the same correspondences between percentages (or ranges of percentages) and distribution ratios may be used for different command types.

In the example 400, 91 percent of the historical commands are read commands. Thus, as shown by reference number 430, the controller 130 may look up an entry in the table 420 for a percentage range corresponding to 91%, which is shown as an entry that indicates a percentage less than 100% and greater than or equal to 90%. The controller 130 may identify the distribution ratio indicated in that entry, shown as a distribution ratio of 4:1. Thus, based on the historical workload associated with the memory device 120, the controller 130 may assign four incoming read commands to a read-dedicated command processor, may then assign one incoming read command to a write-dedicated command processor, may then assign the next four incoming read command to the read-dedicated command processor, and so on.

Similarly, 6 percent of the historical commands are write commands in the example 400. Thus, as shown by reference number 435, the controller 130 may look up an entry in the table 425 for a percentage range corresponding to 6%, which is shown as an entry that indicates a percentage less than 70%. The controller 130 may identify the distribution ratio indicated in that entry, shown as a distribution ratio of 1:0. Thus, based on the historical workload associated with the memory device 120, the controller 130 may assign all incoming write commands to a write-dedicated command processor.

In this way, the memory device 120 may enable a performance requirement (e.g., an IOPS requirement) to be satisfied and/or may enable performance of the memory device 120 to be improved (e.g., to reduce latency) without the need to add additional dedicated processors to the memory device 120. Furthermore, the memory device 120 described herein improves performance by better utilizing command processor resources without increasing manufacturing costs or increasing power consumption.

As shown in FIG. 4B, and by reference number 440, the controller 130 may detect incoming commands, shown as six read commands (Read Command 1 through Read Command 6), followed by one write command (Write Command 1), followed by another read command (Read Command 7), followed by another write command (Write Command 2), followed by three read commands (Read Command 8 through Read Command 10). As shown by reference number 445, the controller 130 may distribute these incoming commands between a first command processor 250*a* and a second command processor 250*b* based on the determined distribution ratio of 4:1 for read commands and 1:0 for write commands, as described above in connection with FIG. 4A.

The first command processor 250*a* is a primary command processor for a first command type, such as read commands, and a secondary command processor for a second command type, such as write commands. Thus, the first command processor 250*a* processes (e.g., executes) only read commands unless a workload condition is satisfied. In the example 400, the workload condition is a historical workload condition. In some implementations, the historical workload condition is that a percentage of memory commands, indicated in the historical workload information and having a command type other than the first command type (e.g., other than a read command type), satisfies a threshold. Additionally, or alternatively, the historical workload condition may be that a percentage of memory commands, indicated in the historical workload information and having a second command type (e.g., a write command type), satisfies a threshold. In the example 400, the first command processor 250*a* is a read-dedicated command processor.

Similarly, the second command processor 250*b* is a primary command processor for the second command type, such as write commands, and a secondary command processor for the first command type, such as read commands. Thus, the second command processor 250*b* processes (e.g., executes) only write commands unless a workload condition is satisfied, such as a historical workload condition. In some implementations, the historical workload condition is that a percentage of memory commands, indicated in the historical workload information and having a command type other than the second command type (e.g., other than a write command type), satisfies a threshold. Additionally, or alternatively, the historical workload condition may be that a percentage of memory commands, indicated in the historical workload information and having a first command type (e.g., a read command type), satisfies a threshold. In the example 400, the second command processor 250*b* is a write-dedicated command processor.

Thus, the memory device 120 may include multiple command processors 250, as described elsewhere herein. Each command processor 250, included in the multiple command processors 250, may be configured to execute only commands included in a set of commands (e.g., a set of one or more commands) associated with that command processor 250 unless a historical workload condition is satisfied.

As shown in FIG. 4B, as read commands are detected by the controller 130, the controller 130 may distribute those read commands between the first command processor 250*a* and the second command processor 250*b* with a distribution ratio of 4:1 (e.g., 4 read commands assigned to the first command processor 250*a* for every 1 read command assigned to the second command processor 250*b*). Thus, as shown by reference number 450, the controller 130 may assign the first four read commands (Read Command 1 through Read Command 4) to the first command processor 250*a*. As shown by reference number 455, after assigning four read commands to the first command processor 250*a*, the controller 130 may assign the next read command (Read Command 5) to the second command processor 250*b*. As shown by reference number 460, after assigning one read command to the second command processor 250*b*, the controller 130 then assigns read commands to the first command processor 250*a*, shown as Read Command 6 (e.g., 1 of 4 read commands to be assigned to the first command processor 250*a* before assigning a read command to the second command processor 250*b*).

The next command after Read Command 6 is a write command, shown as Write Command 1. Because the controller 130 distributes write commands between the second command processor 250*b* and the first command processor 250*a* with a distribution ratio of 1:0 (e.g., all write commands assigned to the second command processor 250*b*), the controller 130 assigns Write Command 1 to the second command processor 250*b*, as shown by reference number 465. The next command is a read command, shown as Read Command 7, which the controller 130 assigns to the first command processor 250*a* (e.g., 2 of 4 read commands to be assigned to the first command processor 250*a* before assigning a read command to the second command processor 250*b*), as shown by reference number 470. The next command is a write command, shown as Write Command 2, which the controller 130 also assigns to the second command processor 250*b* according to the 1:0 distribution ratio, as shown by reference number 475.

The next three commands after Write Command 2 are read commands, shown as Read Command 8 through Read Command 10. According to the 4:1 distribution ratio, the controller 130 assigns Read Command 8 and Read Command 9 to the first command processor 250*a* (e.g., 4 of 4 read commands to be assigned to the first command processor 250*a* before assigning a read command to the second command processor 250*b*), as shown by reference number 480. As shown by reference number 485, the controller 130 then assigns Read Command 10 to the second command processor 250*b* according to the 4:1 distribution ratio.

In this way, the memory device 120 may enable a performance requirement (e.g., an IOPS requirement) to be satisfied and/or may enable performance of the memory device 120 to be improved (e.g., to reduce latency) without the need to add additional dedicated processors to the memory device 120. Furthermore, the memory device 120 described herein improves performance by better utilizing command processor resources without increasing manufacturing costs or increasing power consumption.

As indicated above, FIGS. 4A-4B is provided as examples. Other examples may differ from what is described with regard to FIGS. 4A-4B.

FIG. 5 is a flowchart of an example method 500 associated with memory command assignment based on command processor workload. In some implementations, a memory device (e.g., memory device 120) may perform or may be configured to perform one or more process blocks of FIG. 5. In some implementations, another device or a group of devices separate from or including the memory device (e.g., the system 100) may perform or may be configured to perform one or more process blocks of FIG. 5. Additionally, or alternatively, one or more components of the memory device (e.g., the controller 130, a command processor 250, the memory management component 260, the command assignment component 270, and/or the workload determination component 280) may perform or may be configured to perform one or more process blocks of FIG. 5.

As shown in FIG. 5, the method 500 may include detecting a memory command to be executed (block 510). As further shown in FIG. 5, the method 500 may include determining a command type of the memory command, wherein the command type is one of a first command type or a second command type (block 520). As further shown in FIG. 5, the method 500 may include identifying a primary command processor associated with the command type, wherein the primary command processor is one of a plurality of command processors that are configured to execute memory commands for the memory device, and wherein the primary command processor is configured to execute only commands having the first command type unless a first computational credit condition, associated with another command processor of the plurality of command processors, is satisfied (block 530). As further shown in FIG. 5, the method 500 may include determining a cumulative computational credit value, associated with the primary command processor, based on memory commands that are assigned to the primary command processor (block 540). As further shown in FIG. 5, the method 500 may include selectively assigning the memory command to the primary command processor or a secondary command processor, of the plurality of command processors, based on whether the cumulative computational credit value satisfies a threshold, wherein the secondary command processor is configured to execute only commands having the second command type unless a second computational credit condition, associated with another command processor of the plurality of command processors, is satisfied (block 550).

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein, such as the operations described in connection with FIGS. 3A-3D, 4A-4B, 6, and/or 7.

FIG. 6 is a flowchart of an example method 600 associated with memory command assignment based on command processor workload. In some implementations, a memory device (e.g., memory device 120) may perform or may be configured to perform one or more process blocks of FIG. 6. In some implementations, another device or a group of devices separate from or including the memory device (e.g., the system 100) may perform or may be configured to perform one or more process blocks of FIG. 6. Additionally, or alternatively, one or more components of the memory device (e.g., the controller 130, a command processor 250, the memory management component 260, the command assignment component 270, and/or the workload determination component 280) may perform or may be configured to perform one or more process blocks of FIG. 6.

As shown in FIG. 6, the method 600 may include determining a first command type of a first memory command to be executed by the memory device (block 610). As further shown in FIG. 6, the method 600 may include identifying a first command processor associated with the first command type, wherein the first command processor is one of a plurality of command processors that are configured to execute memory commands for the memory device, and wherein the first command processor is configured to execute only commands having the first command type unless a computational credit condition, associated with another command processor of the plurality of command processors, is satisfied (block 620). As further shown in FIG. 6, the method 600 may include determining that a cumulative computational credit value associated with the first command processor does not satisfy a condition, wherein the cumulative computational credit value is based on one or more computational credit values corresponding to one or more memory commands that are assigned to the first command processor for execution (block 630). As further shown in FIG. 6, the method 600 may include assigning the first memory command to the first command processor for execution based on determining that the cumulative computational credit value associated with the first command processor does not satisfy the condition (block 640).

Although FIG. 6 shows example blocks of a method 600, in some implementations, the method 600 may include additional blocks, fewer blocks, different blocks, or differently arranged blocks than those depicted in FIG. 6. Additionally, or alternatively, two or more of the blocks of the method 600 may be performed in parallel. The method 600 is an example of one method that may be performed by one or more devices described herein. These one or more devices may perform or may be configured to perform one or more other methods based on operations described herein, such as the operations described in connection with FIGS. 3A-3D, 4A-4B, 5, and/or 7.

FIG. 7 is a flowchart of an example method 700 associated with memory command assignment based on command processor workload. In some implementations, a memory device (e.g., memory device 120) may perform or may be configured to perform one or more process blocks of FIG. 7. In some implementations, another device or a group of devices separate from or including the memory device (e.g., the system 100) may perform or may be configured to perform one or more process blocks of FIG. 7. Additionally, or alternatively, one or more components of the memory device (e.g., the controller 130, a command processor 250, the memory management component 260, the command assignment component 270, and/or the workload determination component 280) may perform or may be configured to perform one or more process blocks of FIG. 7.

As shown in FIG. 7, the method 700 may include identifying historical workload information for a plurality of command processors configured to execute memory commands for the apparatus, wherein the historical workload information indicates a plurality of memory commands received or detected by the apparatus (block 710). As further shown in FIG. 7, the method 700 may include determining a percentage of memory commands, included in the plurality of memory commands, having a first command type (block 720). As further shown in FIG. 7, the method 700 may include determining a ratio for distributing memory commands of the first command type to a first command processor or a second command processor based on the percentage, wherein the first command processor is included in the plurality of command processors and is configured to execute commands having the first command type, and wherein the second command processor is included in the plurality of command processors and is configured to execute only commands having a second command type, that is different from the first command type, unless a historical workload condition associated with the historical workload information is satisfied (block 730). As further shown in FIG. 7, the method 700 may include distributing a plurality of incoming memory commands between the first command processor and the second command processor based on the ratio (block 740).

Although FIG. 7 shows example blocks of a method 700, in some implementations, the method 700 may include additional blocks, fewer blocks, different blocks, or differently arranged blocks than those depicted in FIG. 7. Additionally, or alternatively, two or more of the blocks of the method 700 may be performed in parallel. The method 700 is an example of one method that may be performed by one or more devices described herein. These one or more devices may perform or may be configured to perform one or more other methods based on operations described herein, such as the operations described in connection with FIGS. 3A-3D, 4A-4B, 5, and/or 6.

Figure 8:
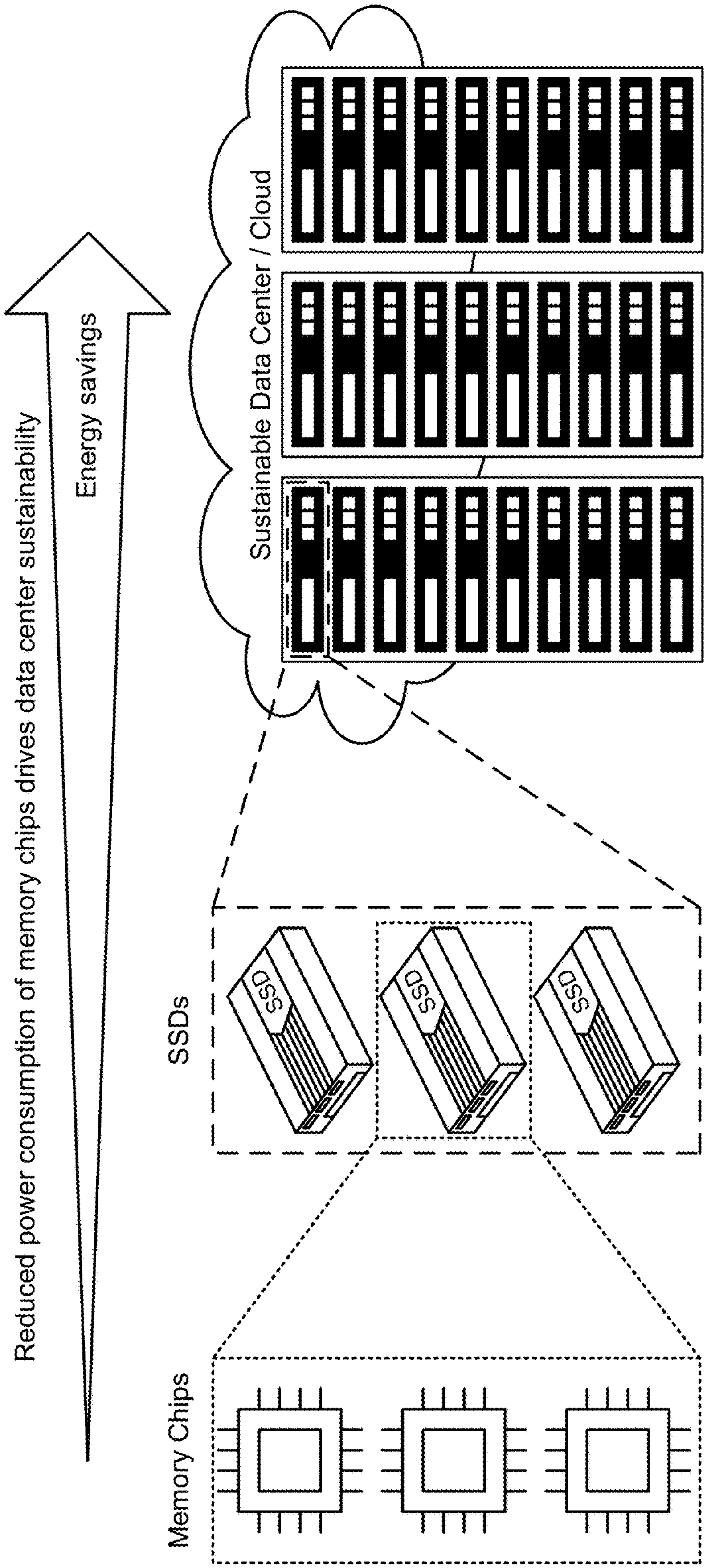
FIG. 8 is a diagram illustrating example systems in which the memory device described herein may be used.

FIG. 8 is a diagram illustrating example systems in which the memory device 120 described herein may be used. In some implementations, one or more memory devices 120 may be included in a memory chip. Multiple memory chips may be packaged together and included in a higher level system, such as a solid state drive (SSD) or another type of memory drive. Each SSD may include, for example, up to five memory chips, up to ten memory chips, or more. A data center or cloud computing environment may include multiple SSDs to store a large amount of data. For example, a data center may include hundreds, thousands, or more SSDs.

As described above, some implementations described herein reduce power consumption of a memory device 120. As shown in FIG. 8, this reduced power consumption drives data center sustainability and leads to energy savings because of the large volume of memory devices 120 included in a data center.

As indicated above, FIG. 8 is provided as an example. Other examples may differ from what is described with regard to FIG. 8.

In some implementations, a memory device includes one or more components configured to: detect a memory command to be executed; determine a command type of the memory command, wherein the command type is one of a first command type or a second command type; identify a primary command processor associated with the command type, wherein the primary command processor is one of a plurality of command processors that are configured to execute memory commands for the memory device, and wherein the primary command processor is configured to execute only commands having the first command type unless a first computational credit condition, associated with another command processor of the plurality of command processors, is satisfied; determine a cumulative computational credit value, associated with the primary command processor, based on memory commands that are assigned to the primary command processor; and selectively assign the memory command to the primary command processor or a secondary command processor, of the plurality of command processors, based on whether the cumulative computational credit value satisfies a threshold, wherein the secondary command processor is configured to execute only commands having the second command type unless a second computational credit condition, associated with another command processor of the plurality of command processors, is satisfied.

In some implementations, a method includes determining, by a memory device, a first command type of a first memory command to be executed by the memory device; identifying, by the memory device, a first command processor associated with the first command type, wherein the first command processor is one of a plurality of command processors that are configured to execute memory commands for the memory device, and wherein the first command processor is configured to execute only commands having the first command type unless a computational credit condition, associated with another command processor of the plurality of command processors, is satisfied; determining, by the memory device, that a cumulative computational credit value associated with the first command processor does not satisfy a condition, wherein the cumulative computational credit value is based on one or more computational credit values corresponding to one or more memory commands that are assigned to the first command processor for execution; and assigning, by the memory device, the first memory command to the first command processor for execution based on determining that the cumulative computational credit value associated with the first command processor does not satisfy the condition.

In some implementations, an apparatus includes means for identifying historical workload information for a plurality of command processors configured to execute memory commands for the apparatus, wherein the historical workload information indicates a plurality of memory commands received or detected by the apparatus; means for determining a percentage of memory commands, included in the plurality of memory commands, having a first command type; means for determining a ratio for distributing memory commands of the first command type to a first command processor or a second command processor based on the percentage, wherein the first command processor is included in the plurality of command processors and is configured to execute commands having the first command type, and wherein the second command processor is included in the plurality of command processors and is configured to execute only commands having a second command type, that is different from the first command type, unless a historical workload condition associated with the historical workload information is satisfied; and means for distributing a plurality of incoming memory commands between the first command processor and the second command processor based on the ratio.

The foregoing disclosure provides illustration and description but is not intended to be exhaustive or to limit the implementations to the precise forms disclosed. Modifications and variations may be made in light of the above disclosure or may be acquired from practice of the implementations described herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:

determining, by a memory device, a first command type of a first memory command to be executed by the memory device;

identifying, by the memory device, a first command processor associated with the first command type, wherein the first command processor is one of a plurality of command processors that are configured to execute memory commands for the memory device, and wherein the first command processor is configured to execute only commands having the first command type unless a computational credit condition, associated with another command processor of the plurality of command processors, is satisfied;

determining, by the memory device, that a cumulative computational credit value associated with the first command processor does not satisfy a condition, wherein the cumulative computational credit value is based on one or more computational credit values corresponding to one or more memory commands that are assigned to the first command processor for execution; and assigning, by the memory device, the first memory command to the first command processor for execution based on determining that the cumulative computational credit value associated with the first command processor does not satisfy the condition.

2. The method of claim 1, further comprising:

modifying the cumulative computational credit value associated with the first command processor, to generate an updated cumulative computational credit value associated with the first command processor, based on a computational credit value associated with the first memory command;

detecting a second memory command, to be executed by the memory device, having the first command type;

determining that the updated cumulative computational credit value associated with the first command processor satisfies the condition; and assigning the second memory command to a second command processor, of the plurality of command processors, for execution based on determining that the updated cumulative computational credit value associated with the first command processor satisfies the condition, wherein the second command processor is configured to execute only commands having a second command type, that is different from the first command type, unless a computational credit condition, associated with another command processor of the plurality of command processors, is satisfied.

3. The method of claim 2, wherein at least one of the first command type or the second command type is:

a write command type, a read command type associated with a lower magnitude computational credit value than the write command type, a trim command type associated with a lower magnitude computational credit value than the write command type and the read command type, an unaligned write command type, an unaligned read command type associated with a lower magnitude computational credit value than the unaligned write command type, an aligned write command type associated with a lower magnitude computational credit value than the unaligned write command type, or an aligned read command type associated with a lower magnitude computational credit value than the unaligned read command type and the aligned write command type.

4. The method of claim 2, wherein the computational credit value associated with the first memory command is based on the first command type of the first memory command.

5. The method of claim 2, wherein the computational credit value associated with the first memory command is based on a data transfer size indicated in the first memory command.

6. The method of claim 5, wherein the data transfer size is based on at least one of:

a quantity of logical block addresses indicated in the first memory command, or a storage size associated with the quantity of logical block addresses.

7. The method of claim 2, further comprising:

determining that the first memory command has been executed;

removing the computational credit value, associated with the first memory command, from the updated cumulative computational credit value to generate a further updated cumulative computational credit value associated with the first command processor;

detecting a third memory command, to be executed by the memory device, having the first command type;

determining that the further updated cumulative computational credit value associated with the first command processor does not satisfy the condition; and assigning the third memory command to the first command processor based on determining that the further updated cumulative computational credit value associated with the first command processor does not satisfy the condition.

8. A device, comprising:

one or more components configured to:

determine a first command type of a first memory command to be executed by the device;

identify a first command processor associated with the first command type, wherein the first command processor is one of a plurality of command processors that are configured to execute memory commands for the device, and wherein the first command processor is further configured to execute only commands having the first command type unless a predetermined computational credit condition associated with another command processor of the plurality of command processors is met;

determine that a cumulative computational credit value associated with the first command processor does not satisfy a predefined condition, wherein the cumulative computational credit value is based on one or more computational credit values corresponding to one or more memory commands that are assigned to the first command processor for execution; and assign the first memory command to the first command processor for execution based upon the determination that the cumulative computational credit value does not satisfy the predefined condition.

9. The device of claim 8, wherein the one or more components are further configured to:

modify the cumulative computational credit value associated with the first command processor based on a computational credit value associated with the first memory command.

10. The device of claim 9, wherein the one or more components are further configured to:

assign a second memory command to a second command processor, of the plurality of command processors, based on a determination that an updated cumulative computational credit value for the first command processor satisfies the predefined condition.

11. The device of claim 8, wherein the predefined condition is a workload condition associated with the first command processor.

12. The device of claim 8, wherein the predefined condition comprises a threshold value associated with the plurality of command processors.

13. The device of claim 8, wherein the one or more components are further configured to:

determine an updated cumulative computational credit value associated with the first command processor based on a second memory command having the first command type; and assign the second memory command to a second command processor, of the plurality of command processors, based on determining that the updated cumulative computational credit value associated with the first command processor satisfies the predefined condition.

14. The device of claim 13, wherein the second command processor is configured to execute commands having a second command type unless a computational credit condition, associated with another command processor of the plurality of command processors, is satisfied.

* * * * *